(12) United States Patent
McMahon et al.

(10) Patent No.: US 7,320,408 B2
(45) Date of Patent: Jan. 22, 2008

(54) BULK MATERIAL CARGO CONTAINER LINER WITH INTERNAL RESTRAINT SYSTEM FOR PREVENTING THE OUTWARD BULGING OF THE LINER

(75) Inventors: Michael J. McMahon, Palatine, IL (US); Stanley Piotrowski, Addison, IL (US); Robert G. Kobetsky, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 445 days.

(21) Appl. No.: 10/654,067

(22) Filed: Sep. 4, 2003

(65) Prior Publication Data
US 2005/0052047 A1     Mar. 10, 2005

(51) Int. Cl.
*B65D 88/00* (2006.01)
(52) U.S. Cl. ........................................ 220/1.6
(58) Field of Classification Search ............... 220/1.6, 220/495.01, 495.1, 565, 571, 573, 592, 644, 220/645, 651, 652, 520, 553, 555, 557; 493/93, 493/100, 253; 383/38, 119, 903; 414/467; 229/120.08
See application file for complete search history.

(56) References Cited
U.S. PATENT DOCUMENTS

| | | | |
|---|---|---|---|
| 2,874,866 A | * | 2/1959 | Rudy ........................ 220/523 |
| 4,251,006 A | * | 2/1981 | Smith ........................ 220/553 |
| 4,541,765 A | | 9/1985 | Moore |
| 4,884,722 A | | 12/1989 | Podd |
| 5,137,170 A | | 8/1992 | Matias |
| 5,152,735 A | | 10/1992 | Podd, Jr. et al. |
| 5,193,710 A | | 3/1993 | Podd, Sr. et al. |
| 5,222,621 A | | 6/1993 | Matias |
| 5,421,476 A | | 6/1995 | Matias |
| 5,489,037 A | | 2/1996 | Stopper |
| 5,542,563 A | | 8/1996 | Matias |
| 5,657,896 A | | 8/1997 | Matias |
| 5,685,644 A | * | 11/1997 | Taylor ........................ 383/24 |
| 6,019,243 A | * | 2/2000 | Marino ....................... 220/573 |

FOREIGN PATENT DOCUMENTS

FR           2461661           6/1981

* cited by examiner

*Primary Examiner*—Anthony D. Stashick
*Assistant Examiner*—Harry A Grosso
(74) *Attorney, Agent, or Firm*—Schwartz & Weinrieb

(57) ABSTRACT

A bulk container liner assembly for use in conjunction with a bulk material cargo container comprises structure incorporated therein such that restraint forces are impressed upon or transmitted to the back or rear wall member of the bulk material cargo container liner, along linearly seamed loci, so as to effectively prevent the back or rear wall member of the bulk material cargo container liner from experiencing or undergoing any outward bulging thereof under the influence of the hydrostatic head load forces generated internally within the bulk material cargo container liner as a result of the charging of bulk cargo material into the interior portion of the bulk material cargo container liner.

19 Claims, 10 Drawing Sheets

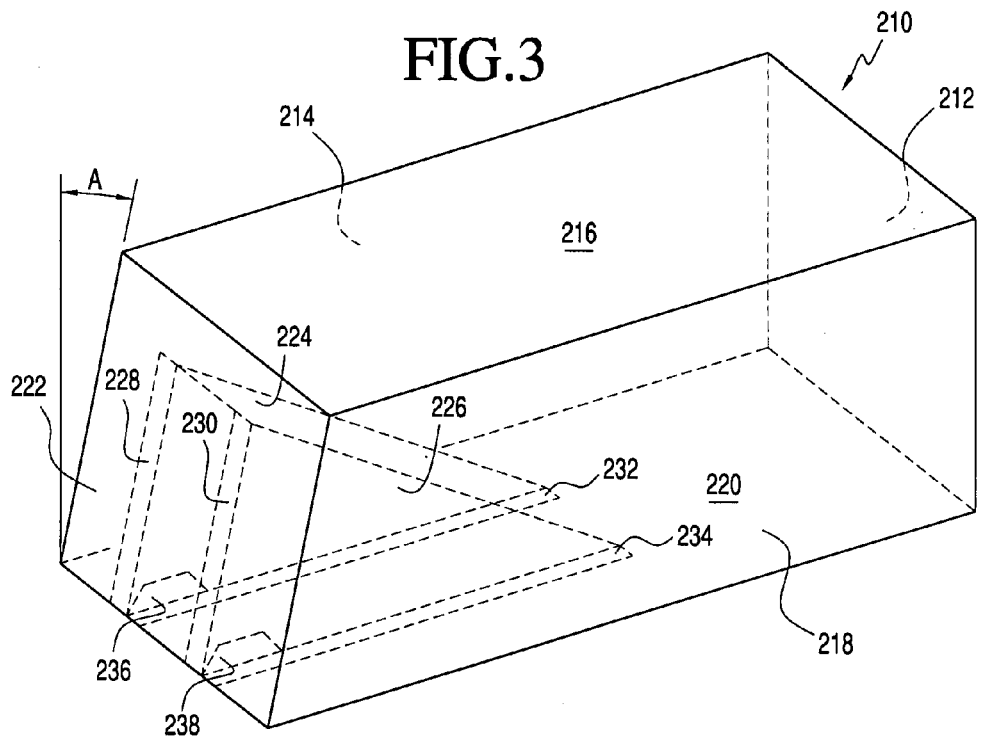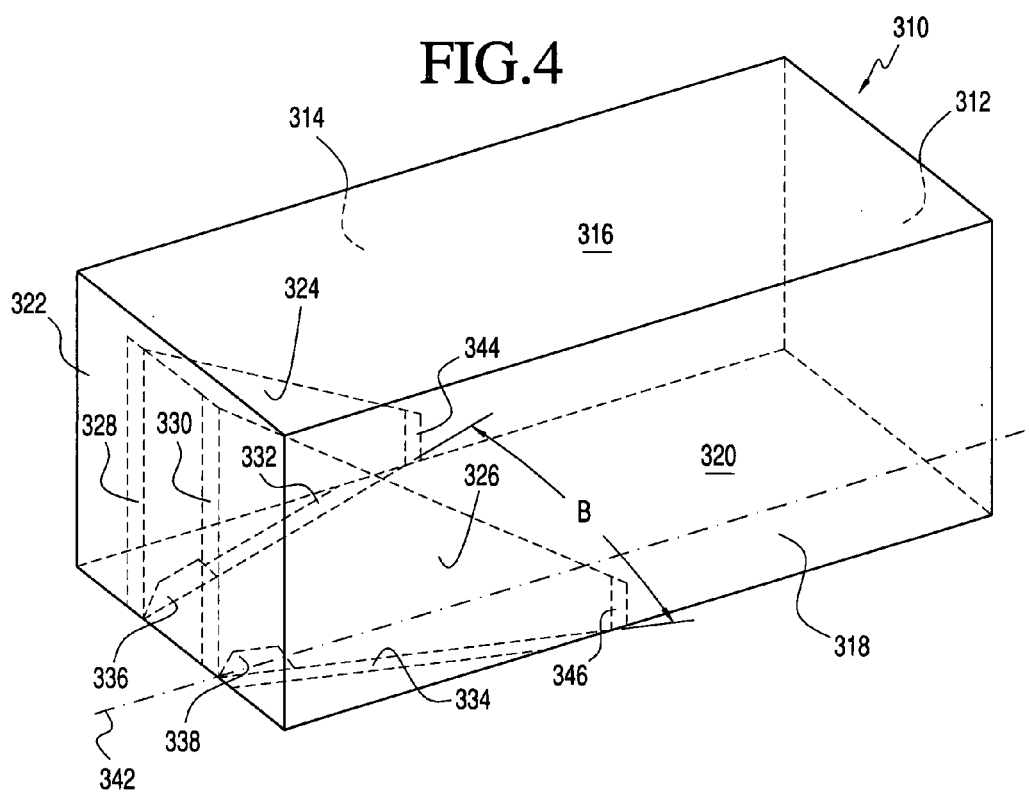

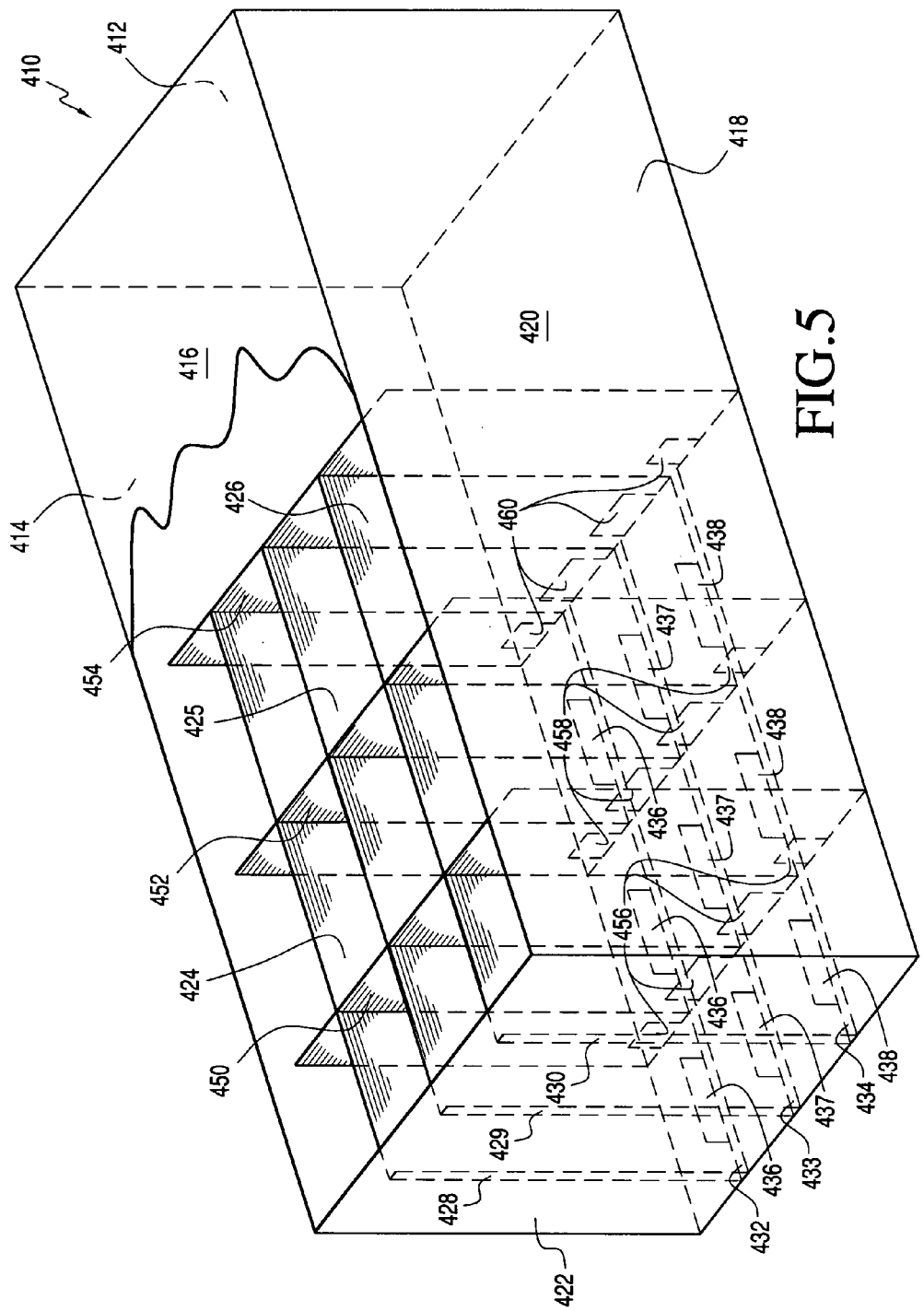

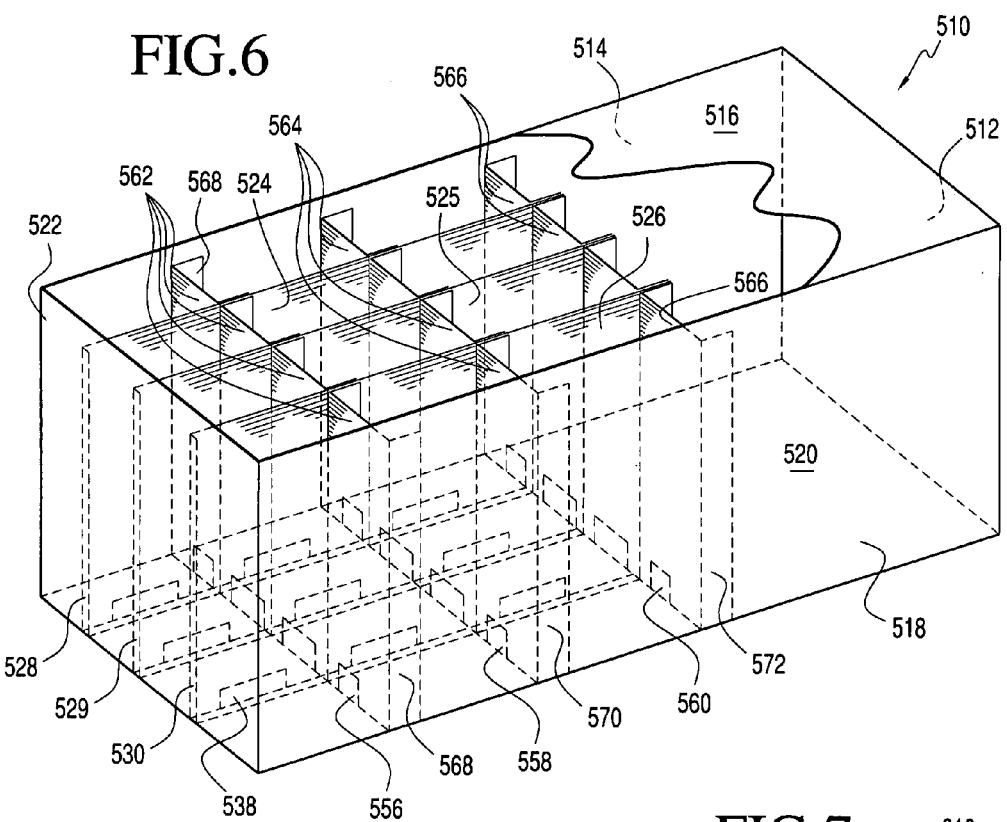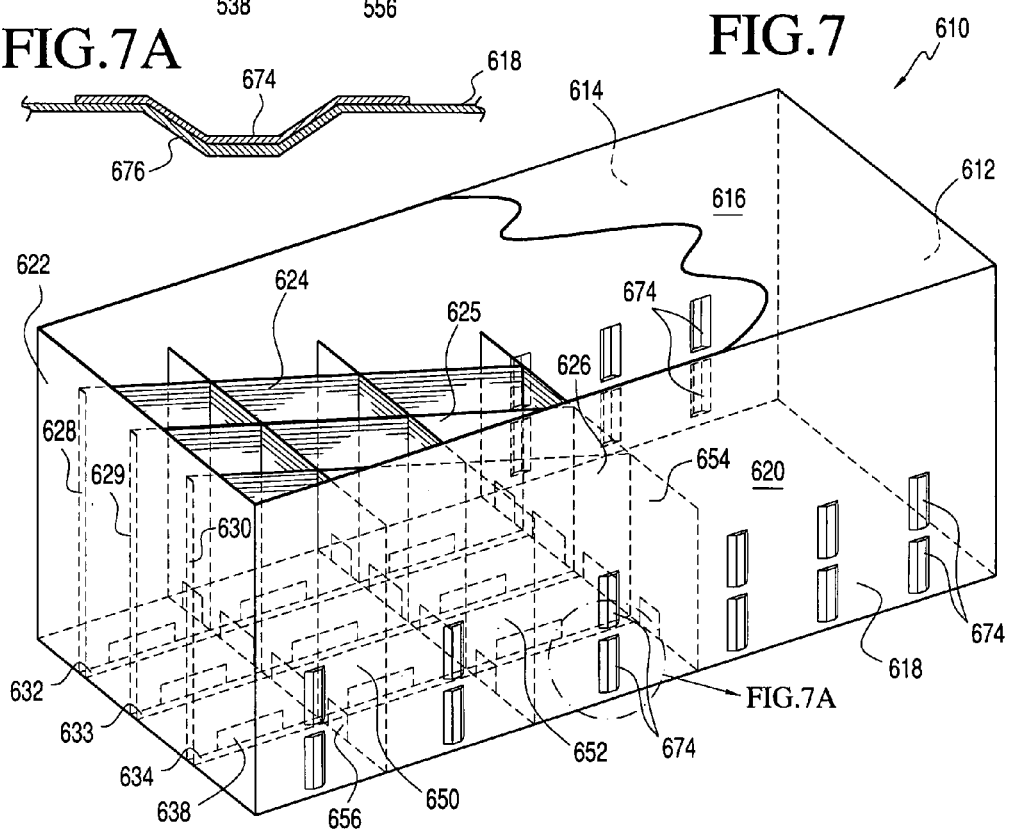

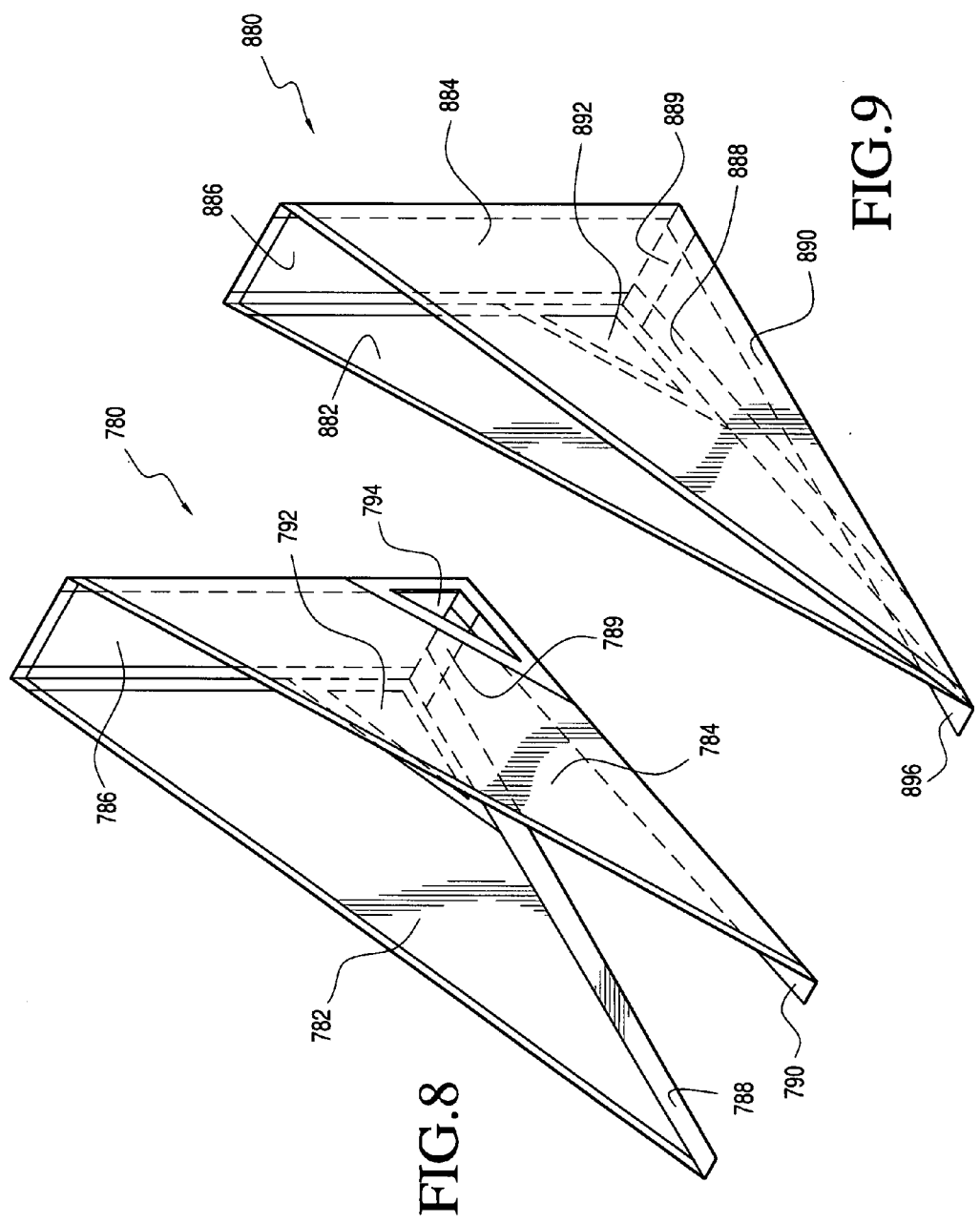

BULK MATERIAL CARGO CONTAINER LINER WITH INTERNAL RESTRAINT SYSTEM FOR PREVENTING THE OUTWARD BULGING OF THE LINER

FIELD OF THE INVENTION

The present invention relates generally to bulk material cargo containers within which fluid-like or flowable bulk cargo materials, such as, for example, dry bulk chemicals, powdered and pelletized resins, flour, coffee beans, grain, and the like, are to be housed or contained while being shipped, transported, or stored, and more particularly to a new and improved bulk material cargo container liner, for use in conjunction with such bulk material cargo containers, wherein the new and improved bulk material cargo container liner is characterized by means of an internal structural system which effectively restricts or prevents the tendency of the rear wall member of the bulk material cargo container liner to experience any rearwardly oriented outward bulging, under the influence of the substantially large hydrostatic head which is normally or inherently impressed upon the rear wall member of the bulk material cargo container liner by means of the bulk cargo material contained within the bulk material cargo container liner, as a result of the bulk cargo material having been charged into or deposited within the bulk material cargo container liner, by imparting restraint forces to the rear wall member of the bulk material cargo container liner.

BACKGROUND OF THE INVENTION

Bulk material cargo containers are conventionally utilized, at different times, to house or contain different fluid-like or flowable bulk cargo materials, such as, for example, dry bulk chemicals, powdered and pelletized resins, coffee beans, flour, grains, rice, sugar, and the like. The bulk material cargo containers are integrally formed within, for example, the cargo holds of ships, trucks, railroad cars, and the like, whereby the bulk cargo materials can readily be shipped or transported from one location to another. Alternatively, the bulk material cargo containers are utilized to temporarily store bulk cargo materials at a particular location prior to the continued transportation or shipping of the bulk cargo materials, or still further, prior to the discharge or unloading of the bulk cargo materials from the bulk material cargo containers. Since different bulk cargo materials are shipped or transported within a particular bulk material cargo container at different times, it is imperative that the bulk material cargo containers effectively be clean so as not to contaminate the materials, comprising a particular bulk material cargo load, with any residual materials which may have remained within the bulk material cargo container from a previously shipped or transported bulk material cargo load. Accordingly, in order to eliminate the necessary cleaning of each bulk material cargo container after a particular bulk material cargo load has been unloaded or discharged from a particular one of the bulk material cargo containers, it has become conventional within the industry to employ removable bulk material container liners within the cargo holds or the bulk material cargo containers whereby, after a particular bulk material cargo load is delivered to its destination and discharged or unloaded, the bulk material cargo container liner is simply removed from the bulk material cargo container, thereby again rendering the bulk material cargo container usable for carrying another bulk material cargo load without requiring a significant amount of cleaning of the bulk material cargo container.

Examples of bulk material cargo container liners as used within bulk material cargo containers for shipping or transporting fluid-like or flowable materials are disclosed within U.S. Pat. No. 5,657,896 which issued on Aug. 19, 1997 to Matias, U.S. Pat. No. 5,542,563 which issued on Aug. 6, 1996 to Matias, U.S. Pat. No. 5,489,037 which issued on Feb. 6, 1996 to Stopper, U.S. Pat. No. 5,421,476 which issued on Jun. 6, 1995 to Matias, U.S. Pat. No. 5,222,621 which issued on Jun. 29, 1993 to Matias, U.S. Pat. No. 5,193,710 which issued on Mar. 16, 1993 to Podd, Sr. et al., U.S. Pat. No. 5,152,735 which issued on Oct. 6, 1992 to Podd, Jr. et al., U.S. Pat. No. 5,137,170 which issued on Aug. 11, 1992 to Matias, U.S. Pat. No. 4,884,722 which issued on Dec. 5, 1989 to Podd, U.S. Pat. No. 4,541,765 which issued on Sep. 17, 1985 to Moore, and FRENCH Patent 2,461,661 which was published on Jun. 2, 1981 in the name of Bac. While the aforenoted removable bulk material cargo container liners have obviously performed satisfactorily from an overall point of view in connection with the achievement of their primary objectives, such removable bulk material cargo container liners have exhibited several operational and structural difficulties. For example, as disclosed within the aforenoted U.S. Pat. No. 5,489,037 which issued to Stopper, U.S. Pat. No. 5,152,735 which issued to Podd, Jr. et al., U.S. Pat. No. 4,884,722 which issued to Podd, and FRENCH Patent 2,461,661 which issued to Bac, bracing systems comprising structural bulkheads, reinforcing straps, and rigid cross-beams, are employed.

More particularly, the structural bulkheads are interposed between the rear end wall portions of the bulk material cargo container liners and the rear end walls of the bulk material cargo containers, which are conventionally formed by means of a pair of pivotal doors, such that the loads or hydrostatic head forces, characteristic of the bulk material disposed internally within the bulk material cargo container liners, are not transferred to the rear doors of the bulk material cargo containers. In addition, strapping systems and reinforcing cross-beams are sometimes additionally utilized in conjunction with the structural bulkheads so as to secure and effectively support the structural bulkheads with respect to the bulk material cargo container as well as with respect to the bulk material cargo container liner. It is therefore readily appreciated that these systems are structurally complex and time-consuming to erect or install. In addition, such bulkheads add a significant amount of weight to the gross weight of the cargo load to be transported or shipped, and they do not always enable the viewing of the interior of the bulk material cargo container liner and the bulk material cargo container whereby, for example, monitoring of the inflation or expansion of the bulk material cargo container liner, and the charging of the bulk materials into the bulk material cargo container liner, are not always able to be readily achieved.

Continuing further, as disclosed within all of the aforenoted Matias patents, relatively complex reinforcing systems, comprising a plurality of reinforcing straps disposed both internally and externally of the bulk material cargo container liners, are utilized. While such reinforcing systems ostensibly serve to in fact reinforce the rear end wall portion of the bulk material cargo container liner, such systems pose potentially defective problems, and in addition, such reinforcing systems are costly to fabricate and implement. For example, it is noted that a plurality of vertically spaced, horizontally oriented external reinforcing straps, and a plurality of horizontally spaced, vertically oriented external reinforcing straps are secured to the external surface of the rear end wall portion of the bulk material cargo container liner so as to effectively crisscross each other at a plurality of intersection locations and thereby form a checker-board arrangement. Still further, a plurality of obliquely oriented tensioning straps are disposed internally within the bulk material cargo container liner wherein first end portions of the internally disposed tensioning straps are fixedly secured to the plurality of externally disposed reinforcing straps at the intersection locations thereof, while second end portions of the plurality of internally disposed tensioning straps are fixedly secured to predetermined locations upon the floor portion of the bulk material cargo container liner. In view of the fact that the internally disposed tensioning straps effectively comprise lineal members, the cross-sectional area of each tensioning strap is extremely small. Accordingly, the resulting interactive clamping force defined or generated between each tensioning strap and the bulk material disposed internally within the bulk material cargo container liner is correspondingly small whereby the securing, holding, or restraint forces, acting upon the rear wall portion of the bulk material cargo container liner, are only a function of the floor-anchoring attachment assembly, the strapping tension, and the rear wall-anchoring attachment assembly defined upon the rear wall portion of the bulk material cargo container liner at each crisscrossed intersection.

A need therefore exists in the art for a new and improved bulk material cargo container liner, for use in conjunction with bulk material cargo containers, and within which bulk cargo materials are to be accommodated for shipping, transportation, and storage purposes, wherein the bulk material cargo container liner must necessarily comprise an internal structural system which will be capable of providing enhanced restraint forces for impression upon the rear wall portion of the bulk material cargo container liner so as to effectively restrict or prevent the tendency of the rear wall portion of the bulk material cargo container liner to experience or undergo any rearwardly oriented outward bulging under the influence of the substantially large hydrostatic head which is normally or inherently impressed upon the rear wall portion of the bulk material cargo container liner by means of the bulk cargo material contained within the bulk material cargo container liner as a result of the bulk cargo material having been charged into or deposited within the bulk material cargo container liner.

OBJECTS OF THE INVENTION

Accordingly, it is an object of the present invention to provide a new and improved bulk material cargo container liner for use within bulk material cargo containers to be filled with bulk material cargo loads.

Another object of the present invention is to provide a new and improved bulk material cargo container liner, for use within bulk material cargo containers to be filled with bulk material cargo loads, which effectively overcomes the various structural and operational drawbacks and disadvantages characteristic of PRIOR ART bulk material cargo container liners.

An additional object of the present invention is to provide a new and improved bulk material cargo container liner, for use within bulk material cargo containers to be filled with bulk material cargo loads, which is relatively simple in structure and economically viable to construct.

A further object of the present invention is to provide a new and improved bulk material cargo container liner, for use within bulk material cargo containers to be filled with bulk material cargo loads, which will be capable of providing enhanced restraint forces for impression upon the rear wall portion of the bulk material cargo container liner so as to effectively restrict or prevent the tendency of the rear wall portion of the bulk material cargo container liner to experience or undergo any rearwardly oriented outward bulging under the influence of the substantially large hydrostatic head which is normally or inherently impressed upon the rear wall portion of the bulk material cargo container liner by means of the bulk cargo material contained within the bulk material cargo container liner as a result of the bulk cargo material having been charged into or deposited within the bulk material cargo container liner.

A last object of the present invention is to provide a new and improved bulk material cargo container liner, for use within bulk material cargo containers to be filled with bulk material cargo loads, wherein an internal structural system, comprising at least a plurality of gussets, structurally interacts with the bulk cargo material present within the bulk material cargo container liner so as to provide enhanced restraint forces for impression upon the rear wall portion of the bulk material cargo container liner which will effectively restrict or prevent the tendency of the rear wall portion of the bulk material cargo container liner to experience or undergo any rearwardly oriented outward bulging under the influence of the substantially large hydrostatic head which is normally or inherently impressed upon the rear wall portion of the bulk material cargo container liner by means of the bulk cargo material contained within the bulk material cargo container liner as a result of the bulk cargo material having been charged into or deposited within the bulk material cargo container liner.

SUMMARY OF THE INVENTION

The foregoing and other objectives are achieved in accordance with the teachings and principles of the present invention through the provision of a new and improved bulk material cargo container liner which, in accordance with any one of the plurality of different embodiments thereof, is generally seen to comprise the utilization of a plurality of gusset members which are disposed internally within the bulk material cargo container liner and which are laterally spaced with respect to each other across the width of the bulk material cargo container liner. Each one of the gusset members comprises, for example, a substantially triangularly, rectangularly, or trapezoidally configured plate member wherein a first side or edge portion of the gusset plate member is integrally attached to, for example, the interior rear wall surface portion of the bulk material cargo container liner, while a second side or edge portion of the substantially triangularly configured gusset plate member is integrally attached to, for example, the interior floor surface portion of the bulk material cargo container liner. It is therefore to be appreciated that, as a result of the aforenoted disposition of the plurality of gusset plate members within the interior of the bulk material cargo container liner, and in view of the integral connections of the plurality of gusset plate members to the interior rear wall surface portion of the bulk material cargo container liner, as well as to the interior floor surface portion of the bulk material cargo container liner, not only are restraint forces imposed upon or distributed to the rear wall portion of the bulk material cargo container along linear loci, as opposed to such forces being conventionally concentrated at point loci, but in addition, retention forces are likewise imposed upon or distributed to the floor portion of the bulk material cargo container along linear loci, as opposed to such forces also being conventionally concentrated at point loci.

Still further, not only are significant clamping forces effectively imposed or impressed upon the opposite side surfaces of each gusset plate member by means of the bulk material disposed within the bulk material cargo container liner so as to effectively maintain each gusset plate member at a fixed location within the interior portion of the bulk material cargo container liner, but in addition, the weight and hydrostatic head forces, characteristic of the bulk material contained within the bulk material cargo container liner, serve to respectively reinforce the integral attachments of the first side or edge portion of each gusset plate member to the interior rear wall surface portion of the bulk material cargo container liner, as well as the integral attachments of the second side or edge portion of each gusset plate member to the interior floor surface portion of the bulk material cargo container liner. In addition to, or in conjunction with the aforenoted substantially rectangularly or trapezoidally configured gusset plate members, transversely oriented, substantially rectangularly configured gusset panel members may likewise be employed such that all of such gusset plate members and gusset panel members are arranged within a cellular array. While such a cellular arrangement or array of the gusset plate and panel members comprises additional economic costs, additional reinforcement and restraint characteristics of such an array or arrangement are also achieved. Still yet further, composite gusset plate assemblies, disposed across the entire width of the bulk material cargo container liner, may also be employed.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 3 is a perspective view similar to that of FIG. 1 showing, however, a third embodiment of a new and improved bulk material cargo container liner, for use within bulk material cargo containers for holding and transporting bulk cargo materials, wherein, in addition to the disposition of the gusset plate members, disposed internally within the bulk material cargo container liner and integrally attached to the interior rear wall surface portion of the bulk material cargo container liner, as well as to the interior floor surface portion of the bulk material cargo container liner, the rear wall surface portion of the bulk material cargo container liner is inclined forwardly toward the front wall surface portion of the bulk material cargo container liner;

FIG. 4 is a perspective view similar to that of FIG. 1 showing, however, a fourth embodiment of a new and improved bulk material cargo container liner, for use within bulk material cargo containers for holding and transporting bulk cargo materials, wherein, in accordance with the teachings and principles of the present invention, a second arrangement of the gusset plate members, disposed internally within the bulk material cargo container liner and integrally attached to the interior rear wall surface portion of the bulk material cargo container liner, as well as to the interior side wall and interior floor surface portions of the bulk material cargo container liner, is disclosed;

FIG. 5 is a perspective view similar to that of FIG. 1 showing, however, a fifth embodiment of a new and improved bulk material cargo container liner, for use within bulk material cargo containers for holding and transporting bulk cargo materials, wherein, in accordance with the teachings and principles of the present invention, a third arrangement of the gusset members, comprising a cellular array of longitudinally and transversely disposed gusset panels and plates, is disposed internally within the bulk material cargo container liner such that the gusset panels and plates are integrally attached to the interior rear wall surface portion, the interior side walls, and the interior floor surface portions of the bulk material cargo container liner;

FIG. 6 is a perspective view similar to that of FIG. 5 showing, however, a sixth embodiment of a new and improved bulk material cargo container liner, for use within bulk material cargo containers for holding and transporting bulk cargo materials, wherein, in accordance with the teachings and principles of the present invention, a fourth arrangement of the gusset members, comprising a cellular array of longitudinally and transversely disposed gusset panels and plates, is disposed internally within the bulk material cargo container liner such that the gusset panels and plates are not only are integrally attached to the interior rear wall surface portion, the interior side walls, and the interior floor surface portions of the bulk material cargo container liner, but are integrally connected to each other;

FIG. 7 is a perspective view similar to that of FIG. 5 showing, however, a seventh embodiment of a new and improved bulk material cargo container liner, for use within bulk material cargo containers for holding and transporting bulk cargo materials, wherein, in accordance with the teachings and principles of the present invention, a third arrangement of gusset members, comprising a cellular array of longitudinally and transversely disposed gusset panels and plates, is disposed internally within the bulk material cargo container liner such that the gusset panels and plates are integrally attached to the interior rear wall surface portion, the interior side walls, and the interior floor surface portions of the bulk material cargo container liner, wherein further, the height dimensions of the gusset panels and plates diminish in direction extending from the rear wall portion of the bulk material cargo container liner toward the front wall portion of the bulk material cargo container liner, and still further, cleat structures are integrally incorporated within exterior side wall portions of the bulk material cargo container liner for mating with corresponding structures integrally formed within side wall portions of the bulk material cargo container so as to maintain the bulk material cargo container liner fixed in position with respect to the bulk material cargo container;

FIG. 7A is an enlarged cross-sectional view of the circled region disclosed within FIG. 7 showing the details of the cleat structure integrally incorporated within the exterior side wall portions of the bulk material cargo container liner as structurally cooperating with the corresponding structures integrally formed within the side wall portions of the bulk material cargo container for maintaining the bulk material cargo container liner fixed in position with respect to the bulk material cargo container;

FIG. 8 is a perspective view of a first embodiment of a modified gusset plate assembly, which may be incorporated within a bulk material cargo container liner in a manner similar to that as disclosed within FIG. 1, wherein, however, in lieu of individual gusset plate members being integrally connected to, for example, the rear wall and floor portions of the bulk material cargo container liner, the modified gusset plate assembly, which is adapted to be integrally connected to the rear wall and floor portions of the bulk material cargo container liner, comprises a pair of longitudinally extending gusset plate members which are disposed parallel to each other and which are integrally connected together by means of a transversely oriented reinforcement panel;

FIG. 9 is a perspective view similar to that of FIG. 8 showing, however, a second modified gusset plate assembly, which may also be incorporated within a bulk material cargo container liner in a manner similar to that as disclosed within FIG. 1, wherein, however, in lieu of the pair of parallel gusset plate members being integrally connected together by means of the transversely oriented reinforcement panel as disclosed within FIG. 8, the pair of gusset plate members extend away from the transversely oriented reinforcement panel in a convergent manner so as to be connected together at a point along the floor portion of the bulk material cargo container liner;

FIG. 8, is incorporated therein;

DETAILED DESCRIPTION OF THE ILLUSTRATED EMBODIMENTS

Figure 1:
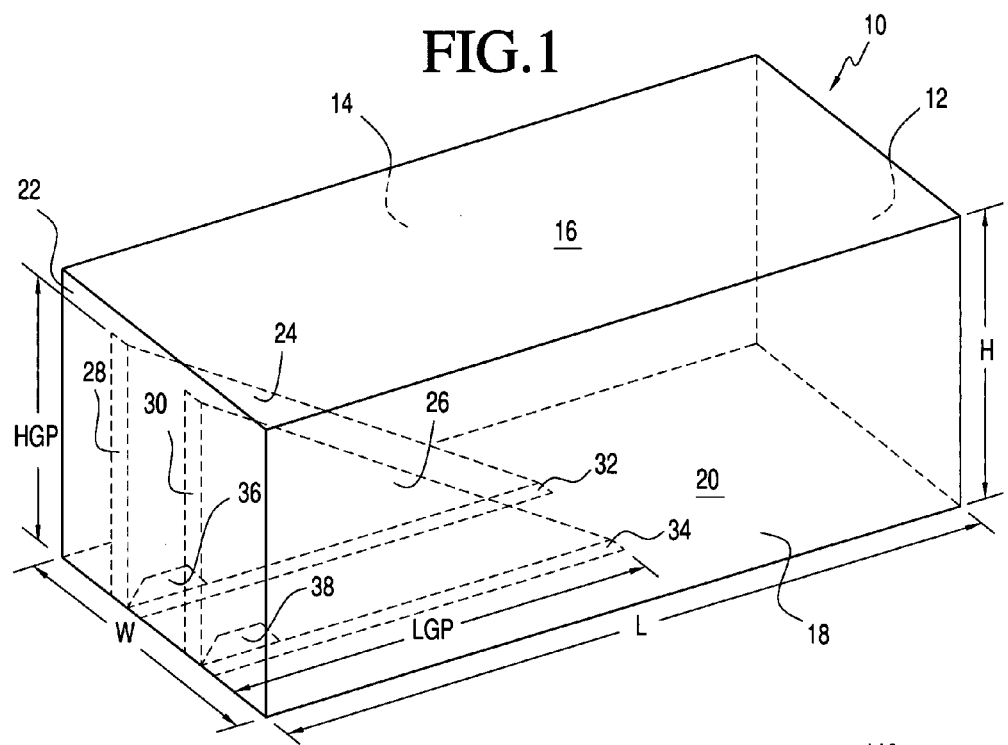
FIG. 1 is a perspective view of a first embodiment of a new and improved bulk material cargo container liner, for use within bulk material cargo containers for holding and transporting bulk cargo materials, wherein, in accordance with the teachings and principles of the present invention, a first arrangement of gusset plate members, disposed internally within the bulk material cargo container liner and integrally attached to the interior rear wall surface portion of the bulk material cargo container liner, as well as to the interior floor surface portion of the bulk material cargo container liner, is disclosed.

Referring now to the drawings, and more particularly to FIG. 1 thereof, a first embodiment of a new and improved bulk material cargo container liner, which is constructed in accordance with the teachings and principles of the present invention and which is adapted for use within bulk material cargo containers for holding and transporting bulk cargo materials, is illustrated and is generally indicated by the reference character 10. More particularly, the new and improved bulk material cargo container liner 10 of the present invention is preferably fabricated from a suitable material, such as, for example, extruded polyethylene, and as can readily be appreciated from FIG. 1, the bulk material cargo container liner 10 has a geometrical configuration which substantially comprises that of a rectangular parallelepiped. Accordingly, the bulk material cargo container liner 10 is seen to include, as viewed in FIG. 1, a front or forward wall member 12, a left side wall member 14, a top or ceiling member 16, a right side wall member 18, a bottom or floor member 20, and a back or rear wall member 22. Still further, it is noted that the bulk material cargo container liner 10 preferably has a width dimension W of ninety-two inches (92") or approximately eight feet (8.00'), a length dimension L of two hundred thirty-two inches or approximately nineteen and one-third feet (19.33'), and a height dimension H of ninety-four inches (94") or approximately eight feet (8.00'). Still further, it is to be understood that in order to facilitate the loading of bulk cargo materials into the bulk material cargo container liner 10, the bulk material cargo container liner 10 is provided with a suitable loading port or sleeve, which is not shown but which may be similar to those shown within the aforenoted patents to Stopper and Podd, Sr. et al., and in a similar manner, in order to facilitate the unloading of the bulk cargo materials from the bulk material cargo container liner 10, the bulk material cargo container liner 10 is likewise provided with a discharge port or sleeve member, which is also not shown but which may likewise be similar to those shown within the aforenoted patents to Stopper and Podd, Sr. et al.

Continuing still further, and in accordance with the unique and novel structure specifically characteristic of the new and improved first embodiment bulk material cargo container liner 10 constructed in accordance with the principles and teachings of the present invention, and with reference still being made to FIG. 1, a plurality, for example, a pair, of laterally spaced gusset plates 24, 26 are adapted to be fixedly attached to the back or rear wall member 22 of the bulk material cargo container liner 10, as well as being fixedly attached to the bottom or floor member 20 of the bulk material cargo container liner 10. Each one of the gusset plates 24, 26 has a substantially right-triangular geometrical configuration, and therefore, the vertically oriented leg or edge portion of each gusset plate 24, 26 is adapted to be fixedly attached to the back or rear wall member 22 of the bulk material cargo container liner 10 along a respective linear seam locus 28, 30, while the horizontally oriented leg or edge portion of each gusset plate 24, 26 is adapted to be fixedly attached to the bottom or floor member 20 of the bulk material cargo container liner 10 along a respective linear seam locus 32, 34.

It is to be noted that the gusset plates 24, 26 are preferably formed from a suitable material which is substantially the same as, or compatible with, the material from which the bulk material cargo container liner 10 is fabricated, and therefore, the attachment of the gusset plates 24, 26, with respect to the back or rear wall member 22, and with respect to the bottom or floor member 20 of the bulk material cargo container liner 10, may be achieved in accordance with any one of a plurality of modes. For example, the gusset plates 24, 26 can be heat-sealed respectively along the aforenoted linear seam loci 28, 30 and 32, 34 to the back or rear wall member 22, and to the bottom or floor member 20, or alternatively, the gusset plates 24, 26 can be secured to the back or rear wall member 22, and to the bottom or floor member 20, by means of suitable stitching. In either case, the aforenoted linear seam loci 28, 30, and 32, 34 are effectively defined by means of folded flap members, formed from the gusset plates 24, 26, which are fixedly attached to the back or rear wall member 22, and to the bottom or floor member 20, of the bulk material cargo container liner 10. It is also to be noted that while only two laterally spaced gusset plates 24, 26 are illustrated in accordance with the principles and teachings of the first embodiment of the bulk material cargo container liner 10 of the present invention, bulk material cargo container liners, constructed in accordance with the principles and teachings of the present invention can comprise more than two gusset plates.

As can be appreciated still further from FIG. 1, each one of the gusset plates 24, 26 has a length dimension or longitudinal extent LGP which may be, for example, up to approximately fifty percent (50%) of the length dimension L of the bulk material cargo container liner 10, and a height dimension HGP which may be, for example, up to approximately ninety-five percent (95%) of the height dimension H of the bulk material cargo container liner 10. While the particular dimensions of each gusset plate 24, 26 may vary, it can be readily appreciated that the surface area of each trianguarly configured gusset plate 24, 26 is substantially large, and that the configurations of the gusset plates 24, 26, the surface areas defined by means of the gusset plates 24, 26, and the attachment of the gusset plates 24, 26 to the back or rear wall member 22, as well as to the bottom or floor member 20, of the bulk material cargo container liner 10, comprise the significant features of the present invention. More particularly, it can be readily be appreciated that, as a result of the interior volume of the bulk material cargo container liner 10 being filled with the particular bulk cargo material, the bulk cargo material present within the bulk material cargo container liner 10 will naturally or inherently exhibit or generate significantly large hydrostatic head forces which will act in all directions so as to in fact be exerted or impressed upon, for example, the front or forward wall member 12, the left side wall member 14, the right side wall member 18, the bottom or floor member 20, and the back or rear wall member 22 of the bulk material cargo container liner 10.

In view of the additional fact, however, that the front or forward wall member 12, the left side wall member 14, the right side wall member 18, and the bottom or floor member 20 of the bulk material cargo container liner 10 are respectively rigidly supported by means of corresponding wall members of the bulk material cargo container within which the bulk material cargo container liner 10 is disposed, such hydrostatic head forces, generated by means of the bulk cargo material, and impressed or exerted upon the front or forward wall member 12, the left side wall member 14, the right side wall member 18, and the bottom or floor member 20 of the bulk material cargo container liner 10, will effectively be suitably or appropriately resisted or counterbalanced. In this manner, those portions of the bulk material cargo container liner 10, as defined by means of the front or forward wall member 12, the left side wall member 14, the right side wall member 18, and the bottom or floor member 20 of the bulk material cargo container liner 10, will be statically disposed within the bulk material cargo container as a result of the front or forward wall member 12, the left side wall member 14, the right side wall member 18, and the bottom or floor member 20 of the bulk material cargo container liner 10 positionally conforming to, or being positionally confined by, the fixed dispositions of the corresponding wall members of the bulk material cargo container within which the bulk material cargo container liner 10 is disposed.

To the contrary, in view of the fact that the back or rear wall of the bulk material cargo container is open, that is, the back or rear wall of the bulk material cargo container does not in effect comprise a fixed, rigid wall member, but to the contrary, comprises a pair of doors that are movable with respect to each other between OPENED and CLOSED positions, such hydrostatic head forces, normally operating upon the back or rear wall member 22 of the bulk material cargo container liner 10, will normally cause the back or rear wall member 22 of the bulk material cargo container liner 10 to experience rearwardly oriented bulging. However, as a result of the disposition of the gusset plate members 24, 26 within the interior portion of the bulk material cargo container liner 10, and in view of the particularly noted fixation of the gusset plate members 24, 26 to the back or rear wall member 22, as well as to the bottom or floor member 20, of the bulk material cargo container liner 10, such rearwardly oriented bulging of the back or rear wall member 22 of the bulk material cargo container liner 10 does not occur. More particularly, as a result of the disposition of the gusset plate members 24, 26 within the interior portion of the bulk material cargo container liner 10, and as a result of the filling of the interior volume of the bulk material cargo container liner 10 with the bulk cargo material, the bulk cargo material, interposed between the pair of gusset plates 24, 26, as well as the bulk cargo material interposed between the left side wall member 14 and the gusset plate 24, and the bulk cargo material interposed between the right side wall member 18 and the gusset plate 26, acts upon the opposite side surfaces of the gusset plates 24, 26 so as to effectively clampingly engage the gusset plates 24, 26 and thereby effectively fixedly secures the gusset plates 24, 26 at their illustrated positions within the interior portion of the bulk material cargo container liner 10.

It can be further appreciated that in conjunction with the aforenoted clamping engagement forces impressed upon the opposite side surfaces of each one of the gusset plates 24, 26 by means of the bulk cargo material interposed between the pair of gusset plates 24, 26, as well as the bulk cargo material interposed between the left side wall member 14 and the gusset plate 24, and the bulk cargo material interposed between the right side wall member 18 and the gusset plate 26, the weight forces of the bulk cargo material disposed within the bulk material cargo container liner 10, as well as the hydrostatic head forces, directed toward and acting upon the bottom or floor member 20 of the bulk material cargo container liner 10, and in particular, the weight and hydrostatic head forces directed toward and acting upon the linear seam loci 32, 34 along which the horizontally oriented leg or edge portion of each gusset plate 24, 26 is fixedly attached to the bottom or floor member 20 of the bulk material cargo container liner 10, serve to fixedly maintain the bottom or floor member 20 of the bulk material cargo container liner 10, and the linear seam loci 32, 34 thereof, at fixed positions within and with respect to the bottom or floor region of the bulk material cargo container.

Accordingly, in view of the fact that the bottom or floor member 20 of the bulk material cargo container liner 10, and the linear seam loci 32, 34 thereof, are maintained at fixed positions within and with respect to the bottom or floor region of the bulk material cargo container, and in view of the fact that the back or rear wall member 22 of the bulk material cargo container liner 10 is effectively fixed in position with respect to the bottom or floor member 20 of the bulk material cargo container liner 10 through means of the gusset plates 24, 26, as attached to the back or rear wall member 22 of the bulk material cargo container liner 10 along the vertically oriented linear seam loci 28, 30, it can be readily appreciated that the gusset plates 24, 26 effectively exert restraining forces upon the back or rear wall member 22 of the bulk material cargo container liner 10 such that the back or rear wall member 22 of the bulk material cargo container liner 10 cannot in fact experience, exhibit, or undergo rearwardly oriented bulging. It is therefore to be further appreciated that as a result of the structural incorporation of the gusset plates 24, 26 within the bulk material cargo container liner 10, and the consequent internal restraining forces generated by the gusset plates 24, 26 and accordingly impressed upon the back or rear wall member 22 of the bulk material cargo container liner 10, the need for structural bulkheads, and external securing or reinforcing strapping, characteristic of conventional PRIOR ART bulk material cargo container liners, is obviated.

Still further, in view of the utilization of the gusset plates 24, 26, and the fixation of the same to the back or rear wall member 22 of the bulk material cargo container liner 10, and to the bottom or floor member 20 of the bulk material cargo container liner 10, along the respective linear seam loci 28, 30 and 32, 34, relatively large clamping forces able to be impressed upon the opposite side surfaces of each one of the gusset plates 24, 26 by means of the bulk cargo material disposed within the bulk material cargo container liner 10. In addition, and most importantly in conjunction with the generation or development of such clamping forces, restraint forces are impressed upon the back or rear wall member 22 of the bulk material cargo container liner 10, by means of the gusset plates 24, 26, along linear loci as defined by means of the linear seamed portions 28, 30.

Such restraint forces, acting along the noted linear loci, are therefore better able to prevent any rearwardly oriented bulging of the back or rear wall member 22 of the bulk material cargo container liner 10 than simple conventional tie-down strapping, disposed internally within the bulk material cargo container liner as disclosed, for example, within the aforenoted PRIOR ART patents which issued to Matias, in view of the fact that such strapping only exerts forces at point locations as opposed to along linear loci. It is lastly noted in connection with the bulk material cargo container liner 10, as disclosed within FIG. 1, that, in order to facilitate the discharge or unloading of the bulk cargo material from the bulk material cargo container liner 10, each one of the gusset plates 24, 26 is provided with a cross-flow through-passage 36, 38 such that all internal regions within the bulk material cargo container liner 10 can be fluidically connected to the discharge port, not shown, defined within the back or rear wall member 22 of the bulk material cargo container liner 10.

Figure 2:
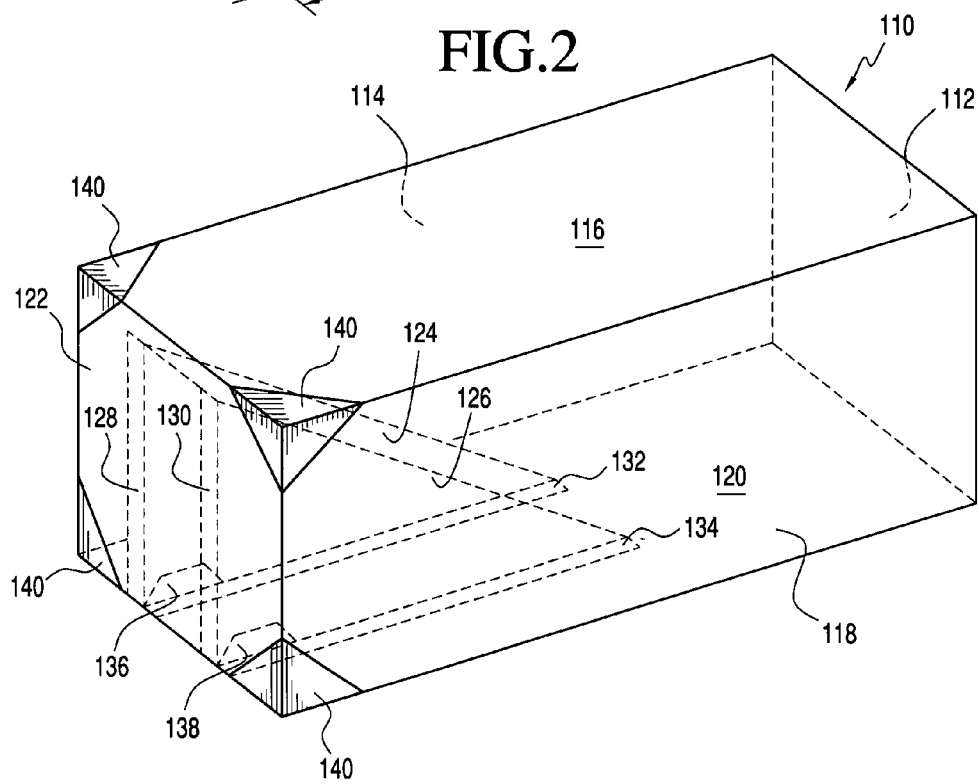
FIG. 2 is a perspective view similar to that of FIG. 1 showing, however, a second embodiment of a new and improved bulk material cargo container liner, for use within bulk material cargo containers for holding and transporting bulk cargo materials, wherein, in addition to the disposition of the gusset plate members, disposed internally within the bulk material cargo container liner and integrally attached to the interior rear wall surface portion of the bulk material cargo container liner, as well as to the interior floor surface portion of the bulk material cargo container liner, corner supports and reinforcement members are also disclosed.

With reference now being made to FIG. 2, a second embodiment of a new and improved bulk material cargo container liner, constructed in accordance with additional teachings and principles of the present invention, and which is likewise adapted for use within bulk material cargo containers for holding and transporting bulk cargo materials, is illustrated and is generally indicated by the reference character 110. It is to be noted that the bulk material cargo container liner 110, as disclosed within FIG. 2, is substantially the same as the bulk material cargo container liner 10 as disclosed within FIG. 1, except as will be noted shortly hereinafter, and therefore, a detailed description of the bulk material cargo container liner 110 will be omitted herefrom for brevity purposes, the description of the bulk material cargo container liner 110 being confined to those structural features incorporated within the bulk material cargo container liner 110 which are different from, or are in addition to, those structural features characteristic of the bulk material cargo container liner 10. It is accordingly noted, still further, that the various structural features characteristic of the bulk material cargo container liner 110 will be designated by means of reference characters similar to those utilized in connection with the bulk material cargo container liner 10 except that the reference characters for the bulk material cargo container liner 110 will be within the 100 series. More particularly, it is noted that the rear corner regions of the bulk material cargo container liner 110 comprise reinforcing structures 140 which are adapted to enhance the strength characteristics of the rear corner regions of the bulk material cargo container liner 110 such that when, for example, external retention strapping, not shown, is connected to such rear corner regions of the bulk material cargo container liner 110, the structural integrity of such rear corner regions of the bulk material cargo container liner 110 can be preserved as a result of the rear corner regions of the bulk material cargo container liner 110 being able to withstand, for example, tensile stresses without suffering or exhibiting structural failure. The external strapping is utilized, for example, in order to simply retain the bulk material cargo container liner 110 at a predeterminedly fixed position within the bulk material cargo container, particularly during, for example, tilting of the bulk material cargo container in order to facilitate the discharging of the bulk cargo material from the bulk material cargo container liner 110. With respect to the actual structural composition comprising the reinforced corner regions 140, such reinforcing structures can comprise, for example, laminated structures fabricated from materials similar to those comprising the bulk material cargo container liner 110, or alternatively, such reinforcing structures can comprise single or multiple plies manufactured from, for example, fabrics or other materials dissimilar to the material from which the bulk material cargo container liner 110 is fabricated.

With reference now being made to FIG. 3, a third embodiment of a new and improved bulk material cargo container liner, constructed in accordance with still additional teachings and principles of the present invention, and which is likewise adapted for use within bulk material cargo containers for holding and transporting bulk cargo materials, is illustrated and is generally indicated by the reference character 210. It is to be noted that the bulk material cargo container liner 210, as disclosed within FIG. 3, is substantially the same as the bulk material cargo container liner 10 as disclosed within FIG. 1, except as will be noted shortly hereinafter, and therefore, a detailed description of the bulk material cargo container liner 210 will be omitted herefrom for brevity purposes, the description of the bulk material cargo container liner 210 being confined to those structural features incorporated within the bulk material cargo container liner 210 which are different from, or are in addition to, those structural features characteristic of the bulk material cargo container liner 10. It is accordingly noted, still further, that the various structural features characteristic of the bulk material cargo container liner 210 will be designated by means of reference characters similar to those utilized in connection with the bulk material cargo container liner 10 except that the reference characters for the bulk material cargo container liner 210 will be within the 200 series.

More particularly, in accordance with the particular principles and teachings characteristic of the bulk material cargo container liner 210, it is noted that the back or rear wall member 222 is disposed within a plane which is inclined in the forward direction, with respect to a vertically oriented plane, through means of a predetermined angle A, which may comprise, for example, approximately 30°. In conjunction with the unique and novel structure characteristic of the bulk material cargo container liner 210, particularly that of the inclined back or rear wall member 222 thereof, and contrary to the disposition or orientation of the substantially triangularly configured gusset plates 24, 26 disposed within the bulk material cargo container liner 10, wherein the right angled corner of each gusset plate 24, 26 was effectively located at the junction defined between the back or rear wall member 22 and the bottom or floor member 20, it is noted that the substantially triangularly configured gusset plates 224, 226 no longer necessarily have right-triangular configurations but in lieu thereof, may comprise a non-right-triangular configurations wherein two sides of each gusset plate 224, 226 still nevertheless extend along the back or rear wall and bottom or floor members 222, 220 of the bulk material cargo container liner 210.

In particular, the predetermined angle A is selected so as to effectively match or correspond with the angle of repose of the bulk cargo material as the same naturally settles into its piled state after being charged into the interior portion of the bulk material cargo container liner 210. In addition, it can be appreciated that as a result of the predetermined inclination of the back or rear wall member 222 of the bulk material cargo container liner 210, and the retention of the back or rear wall member 222 of the bulk material cargo container liner 210 at such predetermined position by means of the gusset plates 224, 226, additional inwardly or forwardly oriented forces are effectively impressed upon the bulk cargo material disposed internally within the bulk material cargo container liner 210 so as to effectively prevent such bulk cargo material from causing any rearwardly oriented bulging of the back or rear wall member 222 of the bulk material cargo container liner 210 to occur.

With reference now being made to FIG. 4, a fourth embodiment of a new and improved bulk material cargo container liner, constructed in accordance with still additional teachings and principles of the present invention, and which is likewise adapted for use within bulk material cargo containers for holding and transporting bulk cargo materials, is illustrated and is generally indicated by the reference character 310. It is to be noted that the bulk material cargo container liner 310, as disclosed within FIG. 4, is substantially the same as the bulk material cargo container liner 10 as disclosed within FIG. 1, except as will be noted shortly hereinafter, and therefore, a detailed description of the bulk material cargo container liner 310 will be omitted herefrom for brevity purposes, the description of the bulk material cargo container liner 310 being confined to those structural features incorporated within the bulk material cargo container liner 310 which are different from, or are in addition to, those structural features characteristic of the bulk material cargo container liner 10. It is accordingly noted, still further, that the various structural features characteristic of the bulk material cargo container liner 310 will be designated by means of reference characters similar to those utilized in connection with the bulk material cargo container liner 10 except that the reference characters for the bulk material cargo container liner 310 will be within the 300 series. More particularly, it is noted that in accordance with the particular structural features characteristic of the fourth embodiment of the bulk material cargo container liner 310, modifications have been made to the gusset plates 324, 326 thereof and their attachment to the interior wall portions of the bulk material cargo container liner 310.

For example, as can be readily appreciated from FIG. 4, it is seen that each one of the gusset plates 324, 326, in lieu of being oriented parallel to the longitudinal axis 342 of the bulk material cargo container liner 310, is now disposed at a predetermined angle with respect to the longitudinal axis 342 of the bulk material cargo container liner 310 such that the included angle B, defined between the pair of gusset plates 324, 326, is approximately 60°. This predetermined angled disposition of the gusset plates 324, 326 within the bulk material cargo container liner 310 provides, in effect, a funnel-type fluid flow for the bulk cargo material that has was previously charged into the interior portion of the bulk material cargo container liner 310 so as to in fact facilitate the discharge or unloading of the bulk cargo material out from the interior portion of the bulk material cargo container liner 310. In addition, it is also seen that each gusset plate 324, 326 has a substantially trapezoidal configuration wherein the distal end portions of the gusset plate 324, 326, located remote from and parallel to the ends of the gusset plates 324, 326 which are fixedly attached to the back or rear wall member 322 of the bulk material cargo container liner 310 along the respective linear loci 328, 330, are respectively fixedly attached to the left and right side wall members 314, 318 of the bulk material cargo container liner 310 along vertically oriented linearly seamed loci 344, 346. Such additional attachments of the gusset plates 324, 326 to the side wall members 314, 318 of the bulk material cargo container liner 310 serve to further enhance the development and presence of the restraint forces that can effectively be impressed upon the back or rear wall 322 of the bulk material cargo container liner 310 by means of the gusset plates 324, 326.

With reference now being made to FIG. 5, a fifth embodiment of a new and improved bulk material cargo container liner, constructed in accordance with still additional teachings and principles of the present invention, and which is likewise adapted for use within bulk material cargo containers for holding and transporting bulk cargo materials, is illustrated and is generally indicated by the reference character 410. It is to be noted that the bulk material cargo container liner 410, as disclosed within FIG. 5, is substantially the same as the bulk material cargo container liner 10 as disclosed within FIG. 1, except as will be noted shortly hereinafter, and therefore, a detailed description of the bulk material cargo container liner 410 will be omitted herefrom for brevity purposes, the description of the bulk material cargo container liner 410 being confined to those structural features incorporated within the bulk material cargo container liner 410 which are different from, or are in addition to, those structural features characteristic of the bulk material cargo container liner 10. It is accordingly noted, still further, that the various structural features characteristic of the bulk material cargo container liner 410 will be designated by means of reference characters similar to those utilized in connection with the bulk material cargo container liner 10 except that the reference characters for the bulk material cargo container liner 410 will be within the 400 series.

More particularly, it is seen from FIG. 5 that in lieu of the provision of only, for example, a pair of laterally spaced gusset plates within the bulk material cargo container liner 410, there has been provided a plurality of longitudinally extending, laterally spaced gusset plates 424, 425, 426 and a plurality of transversely extending, longitudinally spaced gusset panels 450, 452, 454, wherein the plurality of gusset plates 424, 425, 426 and gusset panels 450, 452, 454 all comprise substantially rectangular configurations and are disposed within a cellular array. The entire cellular array, comprising the plurality of gusset plates 424, 425, 426 and gusset panels 450, 452, 454, may be fabricated, for example, as a single one-piece extrusion, from material which is substantially the same as that of the bulk material container liner 410, or from suitable woven material, which is then placed within the bulk material cargo container liner 410, and as was characteristic of the longitudinally extending gusset plates disclosed within the various bulk material cargo container liner embodiments 10, 110, and 210 as disclosed within FIGS. 1-3, the gusset plates 424, 425, 426 are adapted to be fixedly attached to the back or rear wall member 422 of the bulk material cargo container liner 410, as well as to the bottom or floor member 420 of the bulk material cargo container liner 410, along linearly seamed loci 428, 429, 430, and 432, 433, 434, respectively. In order to facilitate or promote the fluidic flow of the bulk cargo material from each individual cell, defined between opposite pairs of the longitudinally extending, laterally spaced gusset plates 424, 425, 426 and the transversely extending, longitudinally spaced gusset panels 450, 452, 454, toward the discharge port, not shown, provided within the back or rear wall member 422 of the bulk material cargo container liner 410, each one of the gusset plates 424, 425, 426 is respectively provided with a series of cross-flow through-apertures 436, 437, 438 which are respectively fluidically connected to each cell, and in a similar manner, each one of the gusset panels 450, 452, 454 is similarly provided with a series of cross-flow through-apertures 456, 458, 460.

Continuing further in connection with the bulk material cargo container liner 410 as disclosed within FIG. 5, it is additionally noted that while the plurality of gusset plates 424, 425, 426 and the plurality of gusset panels 450, 452, 454 are disposed within the aforenoted cellular array wherein the individual cells are longitudinally and transversely aligned with respect to each other, the single, one-piece extrusion, comprising the plurality of gusset plates 424, 425, 426 and gusset panels 450, 452, 454 may be fabricated in such a manner that portions of each longitudinally extending gusset plate 424, 425, 426 are transversely offset with respect to each other, and in a similar manner, portions of each laterally extending gusset panel 450, 452, 454 are longitudinally offset with respect to each other. Accordingly, the individual cells, comprising the cellular array, are not in fact longitudinally and laterally aligned with respect to each other, but to the contrary, are also longitudinally and laterally offset with respect to each other. This alternative arrangement of the individual cells, within the overall cellular array, alters, as may be desired, the transmission of the hydrostatic head load forces to or upon the back or rear wall member 422 of the bulk material cargo container liner 410 in view of the fact that additional hydrostatic head load forces may be transmitted to or impressed upon, for example, the side wall members 414, 418 of the bulk material cargo container liner 410 for ultimate transmission to or upon the side walls of the bulk material cargo container. It is to be further appreciated that the oppositely disposed lateral edge portions of each one of the laterally extending gusset panels 450, 452, 454 need not necessarily be fixedly secured to the inner surface portions of the side wall members 414, 418 of the bulk material cargo container liner 410. The reason for this is that as a result of the fixation of the longitudinally extending gusset plates 424, 425, 426 to the back or rear wall member 422, as well as to the bottom or floor member 420, along the linearly seamed loci 428, 429, 430, and 432, 433, 434, the individual cells will effectively be defined and maintained, within the overall cellular array, as a result of the bulk cargo material being charged into the bulk material cargo container liner 410 and acting upon the opposite surfaces of each one of the longitudinally extending gusset plates 424, 425, 426, as well as upon the opposite surfaces of each one of the laterally extending gusset panels 450, 452, 454 so as to clampingly engage the longitudinally extending gusset plates 424, 425, 426 and the laterally extending gusset panels 450, 452, 454 therebetween.

As a result of the disposition of the cellular array, comprising the plurality of gusset plates 424, 425, 426 and gusset panels 450, 452, 454, within the interior portion of the bulk material cargo container liner 410, and particularly in view of the effective clamping fixation forces impressed upon the individual sections of the gusset plates 424, 425, 426 and the gusset panels 450, 452, 454 so as to form and maintain the individual cells within the overall cellular array, it can be appreciated that the overall hydrostatic head load forces present within the bulk material cargo container liner 410 are effectively distributed throughout the bulk material cargo container liner 410 with the result that the hydrostatic head load forces actually impressed upon the back or rear wall member 422 of the bulk material cargo container liner 410 is effectively reduced. Accordingly, the tendency for the back or rear wall member 422 of the bulk material cargo container liner 410 to experience or undergo rearwardly oriented bulging is, in turn, significantly reduced.

As a structural alternative to the bulk material cargo container liner 410 as disclosed in FIG. 5, wherein the oppositely disposed lateral edge portions of each one of the laterally extending gusset panels 450, 452, 454 are not fixedly secured to the inner surface portions of the side wall members 414, 418 of the bulk material cargo container liner 410, the oppositely disposed lateral edge portions of the laterally extending gusset panels may in fact be fixedly secured to the inner surface portions of the side wall members of the bulk material cargo container liner whereby enhanced restraint forces and rigidity characteristics may be imparted to the overall bulk material cargo container liner, as may be desired. More particularly, with reference being made to FIG. 6, a sixth embodiment of a new and improved bulk material cargo container liner, constructed in accordance with still additional teachings and principles of the present invention, and which is likewise adapted for use within bulk material cargo containers for holding and transporting bulk cargo materials, is illustrated and is generally indicated by the reference character 510. It is to be noted that the bulk material cargo container liner 510, as disclosed within FIG. 6, is quite similar to the bulk material cargo container liner 410 as disclosed within FIG. 5, except as will be noted shortly hereinafter, and therefore, a detailed description of the bulk material cargo container liner 510 will be omitted herefrom for brevity purposes, the description of the bulk material cargo container liner 510 being confined to those structural features characteristic of the bulk material cargo container liner 510 which are different from, or are in addition to, those structural features characteristic of the bulk material cargo container liner 410. It is accordingly noted, still further, that the various structural features characteristic of the bulk material cargo container liner 510 will be designated by means of reference characters similar to those utilized in connection with the bulk material cargo container liner 410 except that the reference characters for the bulk material cargo container liner 510 will be within the 500 series.

Accordingly, it is noted, for example, that, in a manner similar to the bulk material cargo container liner 410, as disclosed within FIG. 5, the bulk material cargo container liner 510, as disclosed within FIG. 6, comprises three, longitudinally extending, laterally spaced, rectangularly configured gusset plates 524, 525, 526 that are respectively fixed to the back or rear wall member 522 of the bulk material cargo container liner 510 along vertically oriented, linearly seamed loci 528, 529, 530, and which are also respectively fixed to the bottom or floor member 520 along horizontally oriented, linearly seamed loci 532, 533, 534. In addition, a plurality of laterally extending, longitudinally spaced, rectangularly configured gusset panel sets 562, 564, 566 structurally interconnect the longitudinally extending, laterally spaced gusset plates 524, 525, 526 together, as well as respectively structurally interconnecting gusset plates 524, 526 to the left and right side wall members 514, 518 of the bulk material cargo container liner 510.

More particularly, it is noted that each set of laterally extending, longitudinally spaced gusset panels 562, 564, 566 comprises four gusset panels, and that each side edge portion of each one of the four gusset panels comprising each set of gusset panels 562, 564, 566 is fixedly connected either to one of the gusset plates 524, 525, 526, or to one of the left or right side wall member 514, 518 along a vertically oriented linearly seamed locus 568, 570, or 572, respectively. Accordingly, as was the case with the bulk material cargo container liner 410 as disclosed within FIG. 5, the overall hydrostatic head load forces present within the bulk material cargo container liner 510 are effectively distributed throughout the bulk material cargo container liner 510 with the result that the hydrostatic head load forces actually impressed upon the back or rear wall member 522 of the bulk material cargo container liner 510 is effectively reduced. Accordingly, still further, the tendency for the back or rear wall member 522 of the bulk material cargo container liner 510 to experience or undergo rearwardly oriented bulging is, in turn, significantly reduced.

Continuing further, and with reference now being made to FIG. 7, a seventh embodiment of a new and improved bulk material cargo container liner, constructed in accordance with still additional teachings and principles of the present invention, and which is likewise adapted for use in bulk material cargo containers for holding and transporting bulk cargo materials, is illustrated and is generally indicated by the reference character 610. It is to be noted that the bulk material cargo container liner 610, as disclosed within FIG. 7, is quite similar to the bulk material cargo container liner 410 as disclosed within FIG. 5, except as will be noted shortly hereinafter, and therefore, a detailed description of the bulk material cargo container liner 610 will be omitted herefrom for brevity purposes, the description of the bulk material cargo container liner 610 being confined to those structural features characteristic of the bulk material cargo container liner 610 which are different from, or are in addition to, those structural features characteristic of the bulk material cargo container liner 410. It is accordingly noted, still further, that the various structural features characteristic of the bulk material cargo container liner 610 will be designated by means of reference characters similar to those utilized in connection with the bulk material cargo container liner 410 except that the reference characters for the bulk material cargo container liner 610 will be within the 600 series. More particularly, it is seen that the bulk material cargo container liner 610, as disclosed within FIG. 7 and in a manner similar to that of the bulk material cargo container liner 410 as disclosed within FIG. 5, is seen to comprise a plurality of longitudinally extending, laterally spaced gusset plates 624, 625, 626 and a plurality of transversely extending, longitudinally spaced gusset panels 650, 652, 654, wherein the plurality of gusset plates 624, 625, 626 and gusset panels 650, 652, 654 are disposed within a cellular array.

Contrary to the cellular array as defined within the bulk material cargo container liner 410, it is seen that the height dimensions of the plurality of transversely extending, longitudinally spaced gusset panels 650, 652, 654 progressively decrease as one proceeds in the direction extending away from the back or rear wall member 622 of the bulk material cargo container liner 610 and toward the front or forward wall member 612 of the bulk material cargo container liner 610, and in conjunction with such height dimensions characteristic of the plurality of transversely extending, longitudinally spaced gusset panels 650, 652, 654, it is also seen that each one of the plurality of longitudinally extending, laterally spaced gusset plates 624, 625, 626 has a substantially trapezoidal configuration with the upper edge portion of each one of the longitudinally extending, laterally spaced gusset plates 624, 625, 626 sloping downwardly as one proceeds in the aforenoted direction extending away from the back or rear wall member 622 of the bulk material cargo container liner 610 and toward the front or forward wall member 612 of the bulk material cargo container liner 610. In this manner, when the bulk cargo material is charged into the interior portion of the bulk material cargo container liner 610 through means of the intake or charging port, not shown, defined within the back or rear wall member 622 of the bulk material cargo container liner 610, migration of the bulk cargo material toward the forward interior region of the bulk material cargo container liner 610 is facilitated.

Continuing still further, and with additional reference being made to FIG. 7A, it is seen that an additional unique and novel structural feature characteristic of the bulk material cargo container liner 610 resides in the provision of a plurality of rigid cleat members 674, fabricated from a suitable plastic material and arranged in vertically aligned sets and fixedly mounted upon the interior surface portions of both the left and right side wall members 614, 618 of the bulk material cargo container liner 610 throughout the longitudinal extent thereof. Each one of the cleat members 674 has a substantially outwardly oriented convex cross-sectional configuration and is specifically designed to structurally cooperate with correspondingly configured concave recessed regions 676 integrally formed within side wall portions of the bulk material cargo container. Accordingly, after the bulk material cargo container liner 610 has been properly disposed and positionally located within the bulk material cargo container, and as a result of the bulk cargo material being charged into the interior portion of the bulk material cargo container liner 610, the bulk material cargo container liner 610 will undergo outward expansion as a result of the hydrostatic head load forces acting or impressed upon, for example, the left and right side wall members 614, 618, as well as upon the front or forward and back or rear wall members 612, 622 of the bulk material cargo container liner 610. As a result of such outward expansion of the bulk material cargo container liner 610, the cleat members 674 will structurally engage the rigid recessed regions 676 defined within the left and right side walls of the bulk material cargo container. These intercooperating cleat and recessed structures 674, 676 will therefore serve to effectively retain the bulk material cargo container liner 610 at a fixed position with respect to the bulk material cargo container, particularly during the tilting of the bulk material cargo container in order to facilitate the unloading or discharge of the bulk cargo material from the interior portion of the bulk material cargo container liner 610.

With reference now being made to FIG. 8, a first embodiment of a modified gusset plate assembly, which has been constructed in accordance with further principles and teachings of the present invention and which may be incorporated, for example, within a bulk material cargo container liner, similar to the bulk material cargo container liner 10 disclosed within FIG. 1, such that each one of the gusset plates 24, 26 would effectively be replaced by means of the modified gusset plate assembly, is disclosed and is generally indicated by the reference character 780. More particularly, it is seen that the gusset plate assembly 780 comprises a pair of substantially right-triangularly configured, laterally separated gusset plates 782, 784 which are interconnected together by means of a vertically oriented, transversely extending reinforcement panel 786. The back or rear surface of the reinforcement panel 786 is adapted to be fixedly attached, or otherwise bonded, along a vertically oriented linearly seamed locus, to the interior surface portion of the back or rear wall member of the bulk material cargo container liner within which the gusset plate assembly 780 is to be disposed. The lower edge portions of the laterally separated gusset plates 782, 784 are respectively provided with oppositely disposed, inwardly extending flap members 788, 790, as is the lower edge portion of the reinforcement panel 786 as disclosed at 789, wherein the undersurface portions of the flap members 788, 789, 790 are adapted to be fixed or otherwise bonded to the interior surface of the bottom or floor member of the bulk material cargo container liner along horizontally oriented linearly seamed loci in such a manner that the laterally separated gusset plates 782, 784 will be disposed parallel to each other. It is lastly seen that each one of the gusset plates 782, 784 is also respectively provided with a cross-flow through-aperture 792, 794 for facilitating the fluid flow of the bulk cargo material during the discharge of the bulk cargo material out from the bulk material cargo container liner.

As can be further appreciated from FIG. 9, a second embodiment of a modified gusset plate assembly, which has also been constructed in accordance with the teachings and principles of the present invention and which may likewise be incorporated, for example, within a bulk material cargo container liner similar to the bulk material cargo container liner 10 disclosed within FIG. 1, is disclosed and is generally indicated by the reference character 880. In view of the fact that the gusset plate assembly 880 is quite similar to the gusset plate assembly 780, except as will be noted shortly hereinafter, a detailed description of the gusset plate assembly 880 will be omitted herefrom for brevity purposes, the description of the gusset plate assembly therefore being confined to those structural features characteristic of the gusset plate assembly 880 which are different from those structural features characteristic of the gusset plate assembly 780. It is accordingly noted still further that the various structural features characteristic of the gusset plate assembly 880 will be designated by means of reference characters similar to those utilized in connection with the gusset plate assembly 780 except that the reference characters for the gusset plate assembly 880 will be within the 800 series.

More particularly, it is seen that in lieu of the laterally spaced gusset plates 882, 884 being disposed either parallel to each other or divergent with respect to each other, the gusset plates 882, 884 are disposed in a relatively convergent mode whereby the distal end portions thereof meet at a common point 896. In view of this particular structure characteristic of the gusset plate assembly 880, the gusset plate assembly 880 can be utilized within, for example, a left rear corner region of the bulk material cargo container liner whereby the gusset plate 882 will serve a funnel function, in connection with the discharge of the bulk cargo material from the bulk material cargo container liner, in a manner similar to that disclosed in connection with the gusset plate 324 as disclosed within the bulk material cargo container liner 310 of FIG. 4. It is additionally noted that the gusset plate 884 is adapted to be fixedly bonded or otherwise attached to the interior surface portion of the left wall member of the bulk material cargo container liner, and accordingly, still further, it is seen that the gusset plate 884 does not have a cross-flow through-aperture formed therein.

Figure 10:
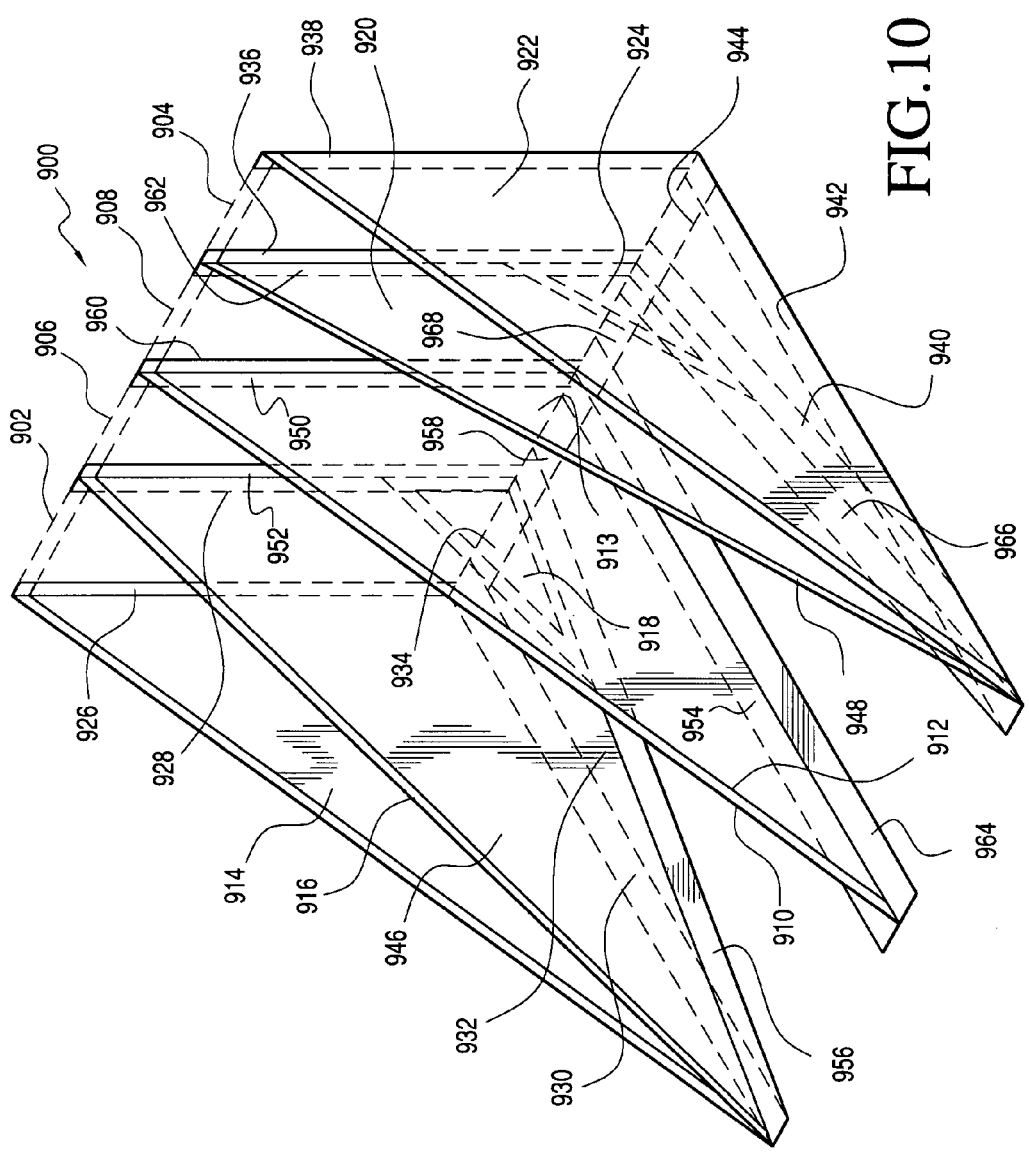
FIG. 10 is a perspective view of a first embodiment of a composite gusset plate assembly, which may also be incorporated within a bulk material cargo container liner in a manner similar to that as disclosed within FIG. 1, and which effectively comprises an oppositely disposed pair of gusset plate assemblies, as disclosed within FIG. 9, which are adapted to be integrally connected to the opposite side walls of the bulk material cargo container liner and which are also adapted to be utilized in combination with a pair of gusset plate assemblies, similar to that disclosed within FIG. 8, wherein, it is noted that the transversely oriented reinforcement panels have been eliminated.

With reference now being made to FIG. 10, a first embodiment of a composite gusset plate assembly, which has also been constructed in accordance with the teachings and principles of the present invention and which may likewise be incorporated, for example, within a bulk material cargo container liner similar to the bulk material cargo container liner 10 disclosed within FIG. 1, is disclosed and is generally indicated by the reference character 900. As may be readily appreciated, the composite gusset plate assembly 900 is seen to comprise, in effect, a pair of gusset plate assemblies 902, 904 which are similar to, or the mirror image of, the gusset plate assembly 880 as disclosed within FIG. 9, and a pair of gusset plate assemblies 906, 908 which are similar to the gusset plate assembly 780, as disclosed in FIG. 8, wherein it is specifically noted that first gusset plates 910, 912 of the gusset plate assemblies 906, 908 are adapted to be fixedly bonded or otherwise attached to each other in a side-by-side manner, a cross-flow through-aperture 913 being defined within the gusset plates 910, 912. The gusset plate assemblies 902, 904 are adapted to be respectively disposed within the opposite rear corner regions of the bulk material cargo container liner, and while all of the gusset plate assemblies 902, 904, 906, 908 may include a transversely extending reinforcement panel, similar to the transversely extending reinforcement panels 786, 886 of the gusset plate assemblies 780, 880 as disclosed within FIGS. 8 and 9, such transversely extending reinforcement panels have been removed from the gusset plate assemblies 902, 904, 906, 908 as disclosed within FIG. 10.

Accordingly, and more particularly, it is seen that the gusset plate assembly 902 comprises a pair of convergent gusset plates 914, 916 wherein the gusset plate 914 is adapted to be fixedly bonded or otherwise attached to the right side wall of the bulk material cargo container liner while gusset plate 916, having a cross-flow through-aperture 918 defined therein, will serve to funnel the bulk cargo material toward the discharge port, not shown, provided within the back or rear wall member of the bulk material cargo container liner. In a similar manner, the gusset plate assembly 904 comprises a pair of convergent gusset plates 920, 922 wherein the gusset plate 922 is adapted to be fixedly bonded or otherwise attached to the left side wall of the bulk material cargo container liner while gusset plate 920, having a cross-flow through-aperture 924 defined therein, will also serve, in conjunction with gusset plate 916, to funnel the bulk cargo material toward the discharge port, not shown, provided within the back or rear wall member of the bulk material cargo container liner. It is additionally noted that all of the gusset plates 914, 916, 920, 922 have substantially right-triangular configurations, and in view of the aforenoted optional removal of the transversely extending reinforcement panels, corresponding to the transversely extending reinforcement panel 886 of the gusset plate assembly 880 as disclosed in FIG. 9, from each gusset plate assembly 902, 904, it is seen that the vertically oriented legs or edge portions of the gusset plates 914, 916 are respectively provided with oppositely facing flap members 926, 928 which are adapted to be fixedly attached to the back or rear wall member of the bulk material cargo container liner along vertically extending linearly seamed loci, while the horizontally oriented legs or edge portions of the gusset plates 914, 916 are likewise respectively provided with oppositely facing flap members 930, 932 which are adapted to be fixedly attached to the bottom or floor member of the bulk material cargo container liner along horizontally extending linearly seamed loci. A horizontally oriented flap member 934, extending transversely between the lower end portions of the gusset plates 914, 916 so as to be positioned within the region of the back or rear wall member of the bulk material cargo container liner, is also adapted to be fixedly attached to the bottom or floor member of the bulk material cargo container liner along a horizontally extending linearly seamed locus.

In a similar manner, it is seen that the vertically oriented legs or edge portions of the gusset plates 920, 922 are respectively provided with oppositely facing flap members 936, 938 which are adapted to be fixedly attached to the back or rear wall member of the bulk material cargo container liner along vertically extending linearly seamed loci, while the horizontally oriented legs or edge portions of the gusset plates 920, 922 are likewise respectively provided with oppositely facing flap members 940, 942 which are adapted to be fixedly attached to the bottom or floor member of the bulk material cargo container liner along horizontally extending linearly seamed loci. A horizontally oriented flap member 944, similar to the horizontally oriented flap 934 operatively associated with the gusset plates 914, 916, likewise extends transversely between the lower end portions of the gusset plates 920, 922 so as to be positioned within the region of the back or rear wall member of the bulk material cargo container liner, and is also adapted to be fixedly attached to the bottom or floor member of the bulk material cargo container liner along a horizontally extending linearly seamed locus. In conjunction with the aforenoted structures of the gusset plate assemblies 902, 904, it is further seen that the gusset plate assembly 906, in addition to the gusset plate 910, comprises a gusset plate 946 which is disposed in a divergent manner with respect to gusset plate 910 so as to be fixedly bonded or otherwise attached to the gusset plate 916 of the gusset plate assembly 902, while in a similar manner, the gusset plate assembly 908, in addition to the gusset plate 912, comprises a gusset plate 948 which is likewise disposed in a divergent manner with respect to gusset plate 912 so as to be fixedly bonded or otherwise attached to the gusset plate 920 of the gusset plate assembly 904.

It is additionally seen that the vertically oriented legs or edge portions of the gusset plates 910, 946 are respectively provided with oppositely facing flap members 950, 952 which are adapted to be fixedly attached to the back or rear wall member of the bulk material cargo container liner along vertically extending linearly seamed loci, while the horizontally oriented legs or edge portions of the gusset plates 910, 946 are likewise respectively provided with oppositely facing flap members 954, 956 which are adapted to be fixedly attached to the bottom or floor member of the bulk material cargo container liner along horizontally extending linearly seamed loci. Still further, a horizontally oriented flap member 958, extending transversely between the lower end portions of the gusset plates 910, 946 so as to be positioned within the region of the back or rear wall member of the bulk material cargo container liner, is also adapted to be fixedly attached to the bottom or floor member of the bulk material cargo container liner along a horizontally extending linearly seamed locus. In a similar manner, it is seen that the vertically oriented legs or edge portions of the gusset plates 912, 948 are respectively provided with oppositely facing flap members 960, 962 which are adapted to be fixedly attached to the back or rear wall member of the bulk material cargo container liner along vertically extending linearly seamed loci, while the horizontally oriented legs or edge portions of the gusset plates 912, 948 are likewise respectively provided with oppositely facing flap members 964, 966 which are adapted to be fixedly attached to the bottom or floor member of the bulk material cargo container liner along horizontally extending linearly seamed loci. It is lastly seen that a horizontally oriented flap member 968, extending transversely between the lower end portions of the gusset plates 912, 948 so as to be positioned within the region of the back or rear wall member of the bulk material cargo container liner, is also adapted to be fixedly attached to the bottom or floor member of the bulk material cargo container liner along a horizontally extending linearly seamed locus.

Figure 11:
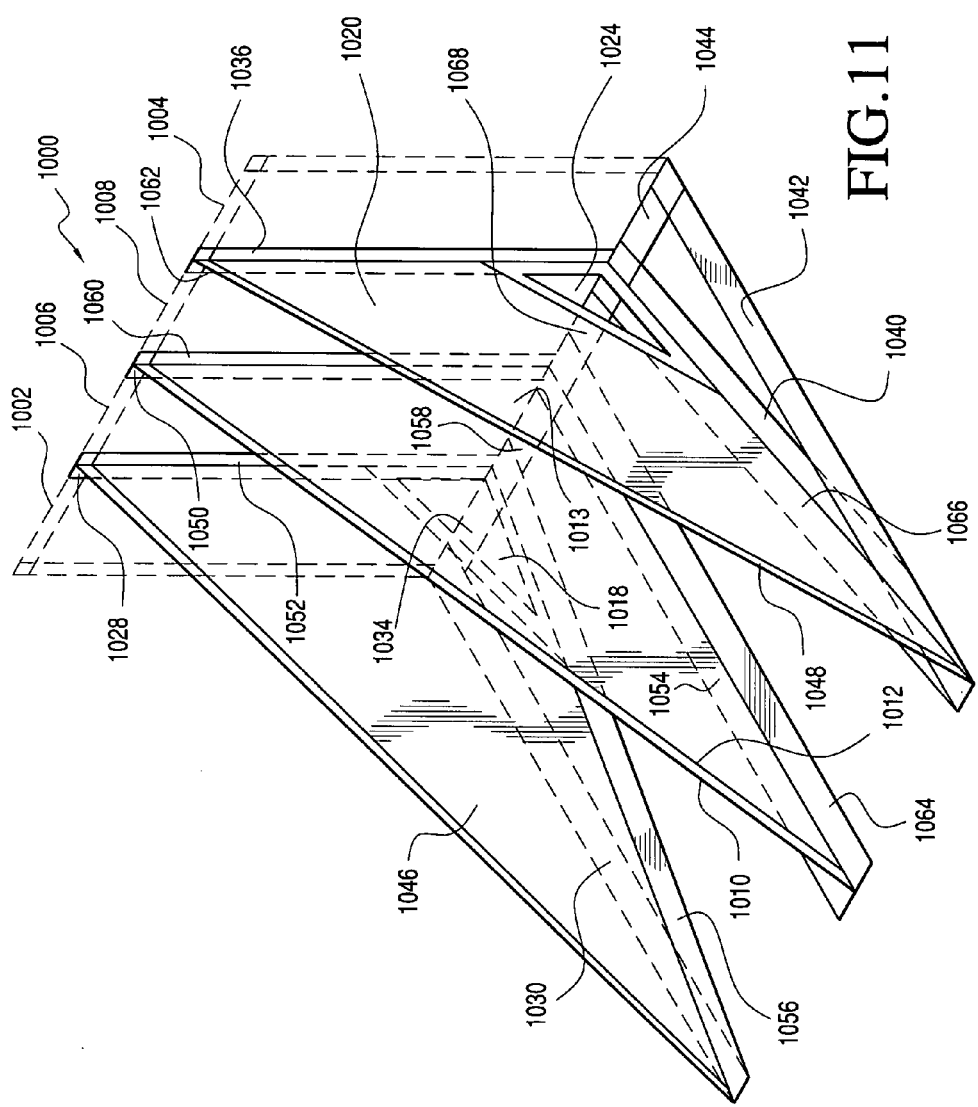
FIG. 11 is a perspective view of a second embodiment of a composite gusset plate assembly similar to that disclosed within FIG. 10, which is likewise adapted to be incorporated within a bulk material cargo container liner in a manner similar to that disclosed within FIG. 1, wherein, however, it is further seen that the gusset plates, which were adapted to be integrally connected to the opposite side walls of the bulk material cargo container liner, have been eliminated.

With reference now being made to FIG. 11, a second embodiment of a composite gusset plate assembly, which has also been constructed in accordance with the teachings and principles of the present invention and which may likewise be incorporated, for example, within a bulk material cargo container liner similar to the bulk material cargo container liner 10 disclosed within FIG. 1, is disclosed and is generally indicated by the reference character 1000. As may be readily appreciated, the composite gusset plate assembly 1000 is seen to be quite similar to the first embodiment of the composite gusset plate assembly 900 as disclosed within FIG. 10, in that the same comprises, in effect, a pair of gusset plate assemblies 1002, 1004 which are respectively similar to the gusset plate assemblies 902, 904 as disclosed within FIG. 10, and a pair of gusset plate assemblies 1006, 1008 which are respectively similar to the gusset plate assemblies 906, 908, as disclosed in FIG. 10. It is noted still further that in view of the fact that the composite gusset plate assembly 1000 is quite similar to the composite gusset plate assembly 900, except as will be noted shortly hereinafter, a detailed description of the composite gusset plate assembly 1000 will be omitted herefrom for brevity purposes, the description of the composite gusset plate assembly 1000 therefore being confined to those structural features characteristic of the composite gusset plate assembly 1000 which are different from those structural features characteristic of the composite gusset plate assembly 900.

It is accordingly noted still further that the various structural features characteristic of the composite gusset plate assembly 1000 will be designated by means of reference characters similar to those utilized in connection with the gusset plate assembly 900 except that the reference characters for the composite gusset plate assembly 1000 will be within the 1000 series. More particularly, it is noted that the only significant difference between the composite gusset plate assembly 1000 as disclosed within FIG. 11, as compared to the composite gusset plate assembly 900 as disclosed within FIG. 10, resides in the fact that the gusset plates, corresponding to the gusset plates 914, 922 of gusset plate assemblies 902, 904, as well as the integrally connected, vertically oriented flap members 926, 938, which are adapted to be fixedly bonded or otherwise attached to the right and left side wall members, as well as the back or rear wall member, of the bulk material cargo container liner, have been eliminated from the composite gusset plate assembly 1000.

Figure 12:
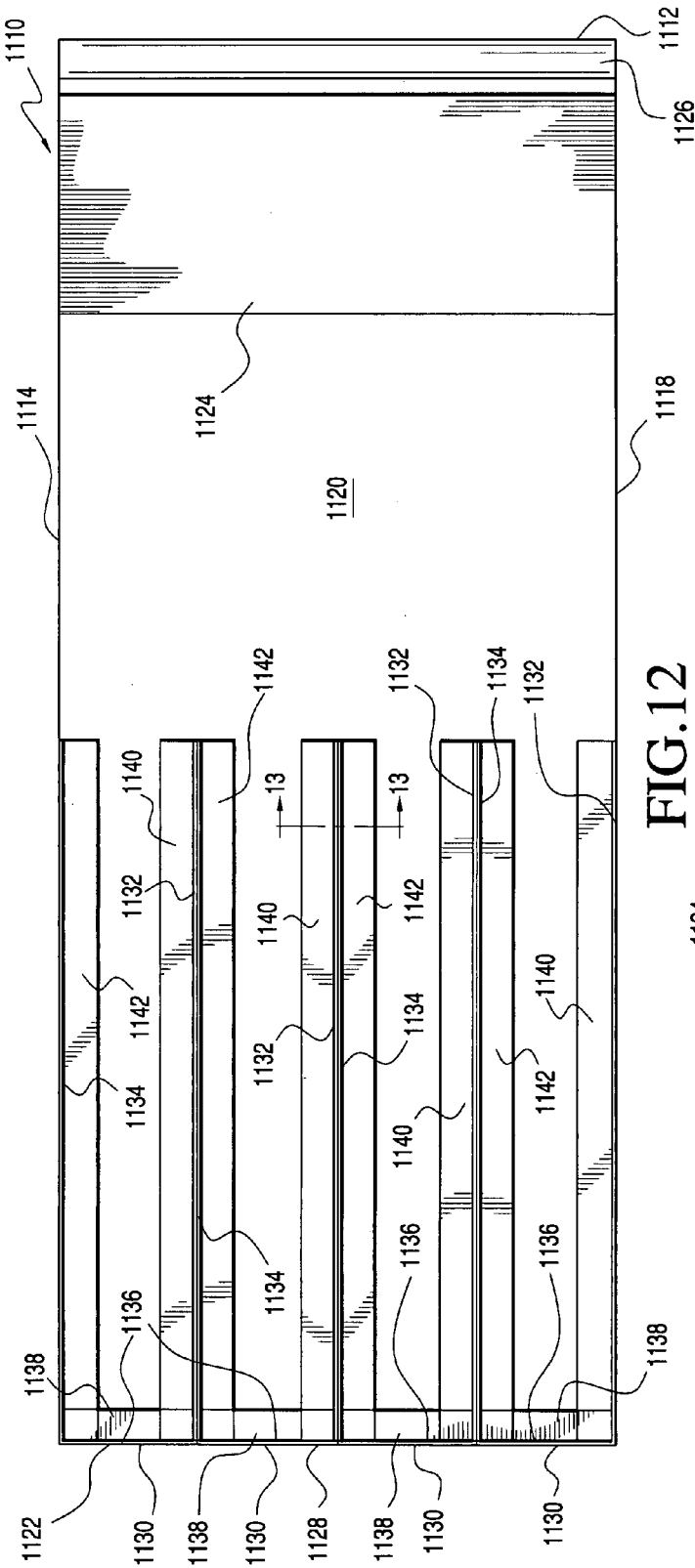
FIG. 12 is a top plan view of an eighth embodiment of a bulk material cargo container liner, for use within a bulk material cargo container, wherein a third embodiment of a composite gusset plate assembly, comprising in effect a plurality of the gusset plate assemblies as disclosed within

With reference now being made to FIG. 12, an eighth embodiment of a new and improved bulk material cargo container liner, constructed in accordance with still additional teachings and principles of the present invention for use within a bulk material cargo container in a manner generally similar to the bulk material cargo container liner 10 as disclosed within FIG. 1, and within which there is incorporated a third embodiment of a composite gusset plate assembly comprising in effect a plurality of the gusset plate assemblies 780 as disclosed within FIG. 8, is disclosed and is generally indicated by the reference character 1110. In view of the similarity of the bulk material cargo container liner 1110, as disclosed within FIG. 12 and as compared to the bulk material cargo container liner 10 as disclosed within FIG. 1, and in view of the similarity of the composite gusset plate assembly incorporated therein as compared to the individual composite gusset plate assembly 780 as disclosed within FIG. 8, except as will be noted shortly hereinafter, a detailed description of the bulk material cargo container liner 1110 will be omitted herefrom for brevity purposes, and the description of the bulk material cargo container liner 1110 will therefore be confined to those structural features characteristic of the bulk material cargo container liner 1110 which are different from, or are in addition to, those structural features characteristic of the bulk material cargo container liner 10 as disclosed within FIG. 1. It is accordingly noted, still further, that the various structural features characteristic of the bulk material cargo container liner 1110 will be designated by means of reference characters similar to those utilized in connection with the bulk material cargo container liner 10 except that the reference characters for the bulk material cargo container liner 1110 will be within the 1100 series.

More particularly, it is seen that the bulk material cargo container liner 1110 has the configuration of a rectangular parallelepiped comprising a front or forward wall member 1112, a left side wall member 1114, a top or ceiling member, not shown, a right side wall member 1118, a bottom or floor member 1120, and a back or rear wall member 1122. In addition, a structural feature characteristic of the bulk material cargo container liner 1110, as opposed to the structural makeup of the bulk material cargo container liner 10, resides in the provision of a reinforcing apron 1124 which is adapted to be fixedly bonded or otherwise attached either to the interior or exterior surface portion of the bottom or floor member 1120 of the bulk material cargo container liner 1110 within the vicinity of the front or forward wall member 1112, and which may comprise, for example, a woven structure fabricated from material similar to that utilized in fabricating the bulk material cargo container liner 1110. Still further, the forwardmost undersurface portion of the bottom or floor member 1120 of the bulk material cargo container liner 1110 is provided with a transversely oriented tubular sleeve member 1126 through which a securing bar, rod, or strap, not shown, may be disposed so as to facilitate the retention of the bulk material cargo container liner 1110 at a fixed position within the bulk material cargo container when the bulk material cargo container is tilted in order to facilitate the discharge of the bulk cargo material from the bulk material cargo container liner 1110.

In addition to the aforenoted structure, it is noted that the bulk material cargo container liner 1110 further includes a composite gusset plate assembly 1128 which comprises a plurality of gusset plate assemblies 1130 which are similar to the gusset assembly 780 as disclosed within FIG. 8. More particularly, it can be appreciated that each one of the gusset plate assemblies 1130 comprises a pair of substantially right-triangularly configured, laterally separated gusset plates 1132, 1134 which are interconnected together by means of a vertically oriented, transversely extending reinforcement panel 1136. The back or rear surface of the reinforcement panel 1136 of each gusset plate assembly 1130 is adapted to be fixedly attached, or otherwise bonded, along a vertically oriented linearly seamed locus, to the interior surface portion of the back or rear wall member 1122 of the bulk material cargo container liner 1110, and the lower edge portion of each reinforcement panel 1136 is provided with a transversely extending, horizontally oriented flap member 1138 which is fixedly attached or otherwise bonded to the bottom or floor member 1120 of the bulk material cargo container liner 1110 within the region of the back or rear wall member 1122 of the bulk material cargo container liner 1110.

Still further, it is to be appreciated that the leftmost gusset plate 1134 of the composite gusset plate assembly 1128 is adapted to be fixedly bonded or otherwise attached to the left side wall member 1114 of the bulk material cargo container liner 1110, while the rightmost gusset plate 1132 of the composite gusset plate assembly 1128 is adapted to be fixedly bonded or otherwise attached to the right side wall member 1118 of the bulk material cargo container liner 1110. In addition, as can best be seen from FIG. 13, the remaining ones of the gusset plates 1132, 1134 are adapted to be fixedly bonded or otherwise attached to each other in a side-by-side fashion, and the lower edge portions of the laterally separated gusset plates 1132, 1134 are respectively provided with oppositely disposed, inwardly extending flap members 1140, 1142 whereby undersurface portions of the flap members 1140, 1142 are adapted to be fixedly attached or otherwise bonded to the interior surface of the bottom or floor member

1120 of the bulk material cargo container liner 1110, along horizontally oriented linearly seamed loci, in such a manner that the laterally separated gusset plates 1132, 1134 are disposed parallel to each other. It is lastly noted that each one of the interior gusset plates 1132, 1134, that is, other than those fixedly attached or bonded to the left and right side wall members 1114, 1118 of the bulk material cargo container liner 1110, are respectively provided with cross-flow through-apertures, not shown, for facilitating the fluid flow of the bulk cargo material during the discharge of the bulk cargo material out from the bulk material cargo container liner 1110.

Figure 13:
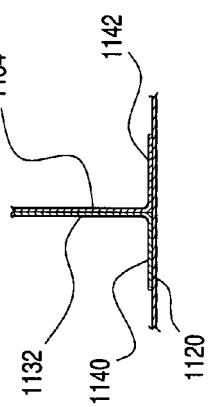
FIG. 13 is a cross-sectional view of, for example, the central one of the gusset plate members as incorporated within the composite gusset plate assembly disclosed within FIG. 12 and as taken along the lines 13-13 of FIG. 12.
Figure 14:
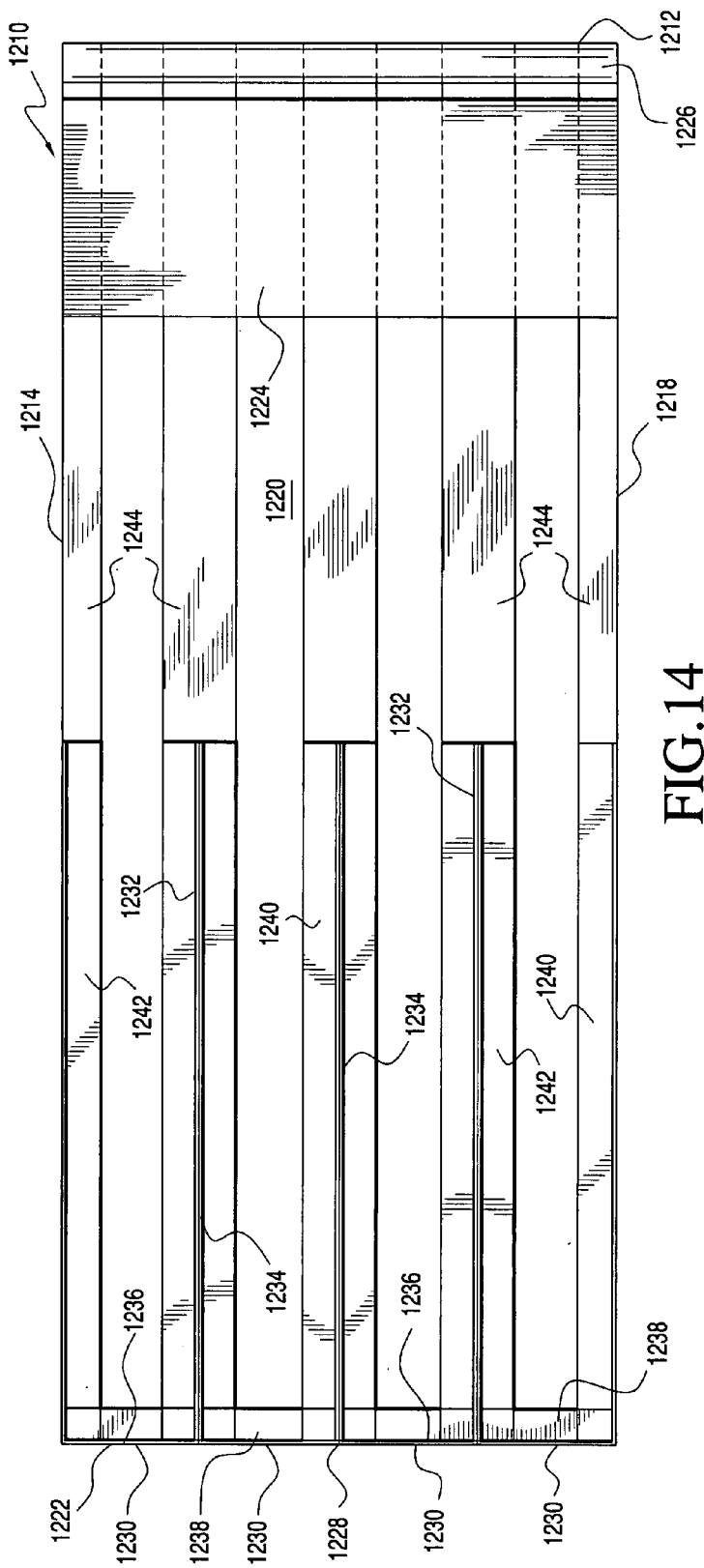
FIG. 14 is a top plan view of a ninth embodiment of a bulk material cargo container liner, for use within a bulk material cargo container, and similar to the bulk material cargo container liner disclosed within FIG. 12, showing, however, a fourth embodiment of a composite gusset plate assembly incorporated therein wherein auxiliary retainer straps are fixedly disposed along the floor portion of the bulk material cargo container liner.

With reference now being made to FIG. 14, a ninth embodiment of a new and improved bulk material cargo container liner, constructed in accordance with still additional teachings and principles of the present invention, adapted for use within a bulk material cargo container, and generally similar to the bulk material cargo container liner 1110 as disclosed within FIG. 13, is disclosed and is generally indicated by the reference character 1210. In view of the similarity of the bulk material cargo container liner 1210, as disclosed within FIG. 14 and as compared to the bulk material cargo container liner 1110 as disclosed within FIG. 13, except as will be noted shortly hereinafter, a detailed description of the bulk material cargo container liner 1210 will be omitted herefrom for brevity purposes, and the description of the bulk material cargo container liner 1210 will therefore be confined to those structural features characteristic of the bulk material cargo container liner 1210 which are different from, or are in addition to, those structural features characteristic of the bulk material cargo container liner 1110 as disclosed within FIG. 13. It is accordingly noted, still further, that the various structural features characteristic of the bulk material cargo container liner 1210 will be designated by means of reference characters similar to those utilized in connection with the bulk material cargo container liner 1110 except that the reference characters for the bulk material cargo container liner 1210 will be within the 1200 series.

More particularly, it is to be appreciated that the only significant difference between the bulk material cargo container liner 1210 as disclosed within FIG. 14, and the bulk material cargo container liner 1110 as disclosed within FIG. 13, resides in the fact that in addition to the structural features characteristic of the bulk material cargo container liner 1110 as disclosed within FIG. 13, the bulk material cargo container liner 1210 as disclosed within FIG. 14 comprises the incorporation of a plurality of laterally spaced, longitudinally extending, reinforcing or retainer strips 1244 fixedly attached to or upon the bottom or floor member 1220 of the bulk material cargo container liner 1210. It is noted that such reinforcing or retainer strips 1244 can be fixedly disposed upon or attached to the interior surface portion of the bottom or floor member 1220 of the bulk material cargo container liner 1210, either by means of suitable stitching, bonding, or the like, so as to effectively interconnect each one of the horizontally oriented linearly seamed flap members 1240, 1242 to the reinforcing apron 1224 whereby, as a result of the weight and hydrostatic forces of the bulk cargo material being disposed upon such reinforcing or retainer strips 1244, the restraint forces can effectively be transmitted by such reinforcing or retainer strips 1244 to the back or rear wall member 1222 of the bulk material cargo container liner 1210 through means of the horizontally oriented linearly seamed flap members 1240, 1242. Alternatively, such reinforcing or retainer strips 1244 can be fixedly disposed upon or attached to the exterior surface portion of the bottom or floor member 1220 of the bulk material cargo container liner 1210 so as to effectively extend along the entire length of the bottom or floor member 1220 of the bulk material cargo container liner 1210 between the back or rear wall member 1222 of the bulk material cargo container liner 1210 and the forward or front wall member 1212 of the bulk material cargo container liner 1210. As is the case with the reinforcing apron 1224, the reinforcing or retainer strips 1244 may be fabricated from material similar to that from which the bulk material cargo container liner 1210 is fabricated, or alternatively, a suitable woven fabric, or the like.

Figure 15:
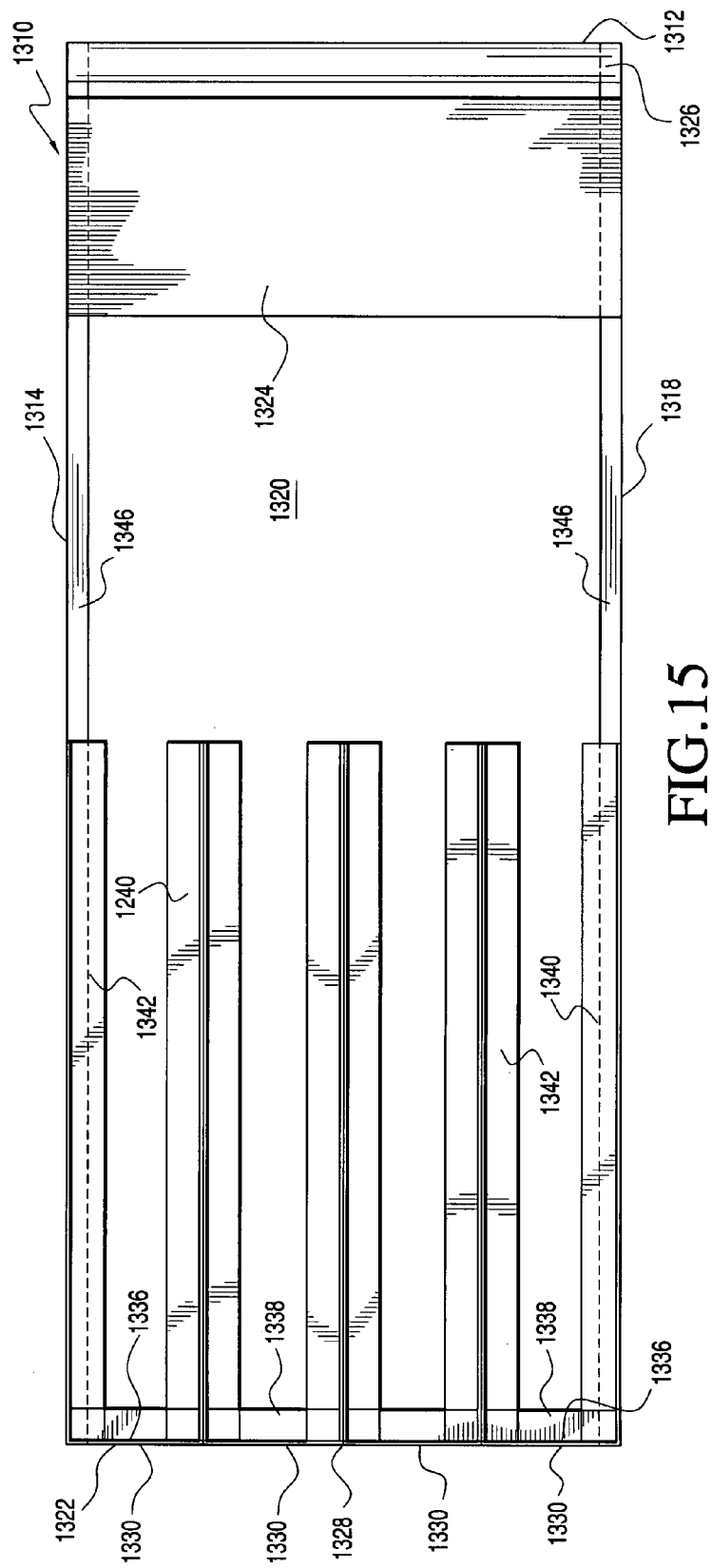
FIG. 15 is a top plan view of a tenth embodiment of a bulk material cargo container liner, for use within a bulk material cargo container, and similar to the bulk material cargo container liners disclosed within FIGS. 12 and 14, showing, however, a fifth embodiment of a composite gusset plate assembly incorporated therein wherein auxiliary high-tensile strength webbing is fixedly disposed along the oppositely disposed side wall floor portions of the bulk material cargo container liner.

With reference now being lastly made to FIG. 15, a tenth embodiment of a new and improved bulk material cargo container liner, constructed in accordance with still additional teachings and principles of the present invention, adapted for use within a bulk material cargo container, and generally similar to the bulk material cargo container liner 1210 as disclosed within FIG. 14, is disclosed and is generally indicated by the reference character 1310. In view of the similarity of the bulk material cargo container liner 1310, as disclosed within FIG. 15 and as compared to the bulk material cargo container liner 1210 as disclosed within FIG. 14, except as will be noted shortly hereinafter, a detailed description of the bulk material cargo container liner 1310 will be omitted herefrom for brevity purposes, and the description of the bulk material cargo container liner 1310 will therefore be confined to those structural features characteristic of the bulk material cargo container liner 1310 which are different from, or are in addition to, those structural features characteristic of the bulk material cargo container liner 1210 as disclosed within FIG. 14. It is accordingly noted, still further, that the various structural features characteristic of the bulk material cargo container liner 1310 will be designated by means of reference characters similar to those utilized in connection with the bulk material cargo container liner 1210 except that the reference characters for the bulk material cargo container liner 1310 will be within the 1300 series.

More particularly, it is to be appreciated that the only significant difference between the bulk material cargo container liner 1310 as disclosed within FIG. 15, and the bulk material cargo container liner 1210 as disclosed within FIG. 14, resides in the fact that in lieu of the plurality of reinforcing or retainer strips 1244 incorporated within the bulk material cargo container liner 1210 as disclosed within FIG. 14, the bulk material cargo container liner 1310 as disclosed within FIG. 15 comprises the incorporation of a pair of laterally spaced, longitudinally extending, high-tensile strength reinforcing webbings 1346 which are fixedly attached to or upon the bottom or floor member 1320 within the regions of the left and right side wall members 1314, 1318 of the bulk material cargo container liner 1310. It is noted that such reinforcing webbings 1346 can be fixedly disposed upon or attached to the interior surface portion of the bottom or floor member 1320 of the bulk material cargo container liner 1210, either by means of suitable stitching, bonding, or the like, and either atop or beneath the horizontally oriented, longitudinally extending flap members 1340, 1342 and the reinforcing apron 1324, so as to again effectively interconnect each one of the horizontally oriented linearly seamed flap members 1340, 1342 to the reinforcing apron 1324 whereby, as a result of the weight and hydrostatic forces of the bulk cargo material being disposed upon such reinforcing webbings 1346, the restraint forces can effectively be transmitted by such reinforcing webbings 1346 to the back or rear wall member 1322 of the bulk material cargo container liner 1310 through means of the horizontally oriented linearly seamed flap members 1340, 1342. Alternatively, such reinforcing webbings 1346 can be fixedly disposed upon or attached to the exterior surface portion of the bottom or floor member 1320 of the bulk material cargo container liner 1310 so as to effectively extend along the entire length of the bottom or floor member 1320 of the bulk material cargo container liner 1310 between the back or rear wall member 1322 of the bulk material cargo container liner 1310 and the forward or front wall member 1312 of the bulk material cargo container liner 1310. As is the case with the reinforcing apron 1324, the reinforcing webbings 1346 may be fabricated from material similar to that from which the bulk material cargo container liner 1310 is fabricated, or alternatively, a suitable woven fabric, or the like.

Thus, it may be seen that in accordance with the principles and teachings of the present invention, there has been provided a new and improved bulk container liner assembly or structure wherein new and improved structure has been incorporated therein such that restraint forces are impressed upon or transmitted to the back or rear wall member of the bulk material cargo container liner, along linearly seamed loci, so as to effectively prevent the back or rear wall member of the bulk material cargo container liner from undergoing or experiencing any outward bulging thereof under the influence of the hydrostatic head load forces generated internally within the bulk material cargo container liner as a result of the charging of bulk cargo material into the interior portion of the bulk material cargo container liner.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A bulk material cargo container liner for use within a bulk material cargo container having rear door structures, comprising:
   a bulk material cargo container liner having a substantially rectangular parallelepiped structure when erected for disposition within a bulk material cargo container and therefore comprising a front wall member, a pair of side wall members, a ceiling member, a floor member, and a rear wall member having a vertically oriented elevational height extent; and
   means, having a vertically oriented, linearly extending edge portion defining a vertically oriented length dimension, fixedly connected to an interior surface portion of said floor member and to an interior surface portion of said rear wall member such that said vertically oriented, linearly extending edge portion extends substantially the entire length of said vertically oriented elevational height extent of said rear wall member for impressing restraint forces, along first linear loci, upon said rear wall member of said bulk material cargo container liner which will effectively reduce the forces normally imposed upon said rear wall member of said bulk material cargo container liner, by means of hydrostatic head load forces generated as a result of bulk cargo material being charged into said bulk material cargo container liner, so as to thereby prevent said rear wall member of said bulk material cargo container liner from undergoing outward bulging.

2. The bulk material cargo container liner as set forth in claim 1, wherein:
   said means disposed within said bulk material cargo container liner, for impressing said restraint forces along said first linear loci upon said rear wall member of said bulk material cargo container liner, comprises a plurality of gusset plates disposed internally within said bulk material cargo container liner.

3. The bulk material cargo container liner as set forth in claim 2, wherein:
   said plurality of gusset plates are disposed internally within said bulk material cargo container liner so as to be disposed parallel to each other.

4. The bulk material cargo container liner as set forth in claim 3, wherein:
   each one of said plurality of gusset plates disposed parallel to each other has a substantially triangular configuration wherein a first side of each one of said substantially triangularly configured gusset plates is fixedly secured to said rear wall member of said bulk material cargo container liner along said first linear loci, while a second side of each one of said substantially triangularly configured gusset plates is fixedly secured to said floor member of said bulk material cargo container liner along second linear loci.

5. The bulk material cargo container liner as set forth in claim 4, wherein:
   said rear wall member of said bulk material cargo container liner is disposed at a predetermined acute angle with respect to said floor member of said bulk material cargo container liner.

6. The bulk material cargo container liner as set forth in claim 2, wherein:
   said plurality of gusset plates are disposed internally within said bulk material cargo container liner so as to be disposed in a divergent manner with respect to each other.

7. The bulk material cargo container liner as set forth in claim 6, wherein:
   each one of said plurality of gusset plates has a substantially trapezoidal configuration wherein a first edge portion of each one of said substantially trapezoidal configured gusset plates is fixedly secured to said rear wall member of said bulk material cargo container liner along said first linear loci, a second edge portion of each one of said substantially trapezoidal configured gusset plates is fixedly secured to said floor member of said bulk material cargo container liner along second linear loci, and a third edge portion of each one of said substantially trapezoidal configured gusset plates is fixedly secured to one of said side wall members of said bulk material cargo container liner.

8. The bulk material cargo container liner as set forth in claim 1, wherein:
   said means disposed within said bulk material cargo container liner for impressing said restraint forces upon said rear wall member of said bulk material cargo container liner, along said first linear loci, and thereby effectively reducing the forces normally imposed upon said rear wall member of said bulk material cargo container liner, comprises a cellular array of gusset members.

9. The bulk material cargo container liner as set forth in claim 8, wherein:
   said cellular array of gusset members comprises a plurality of longitudinally extending gusset plates and a plurality of transversely extending gusset panels.

10. The bulk material cargo container liner as set forth in claim 9, wherein:

said cellular array of gusset members, comprising said plurality of longitudinally extending gusset plates and said plurality of transversely extending gusset panels, comprises a one-piece extrusion.

11. The bulk material cargo container liner as set forth in claim 9, wherein:
said plurality of transversely extending gusset panels are interposed between and individually fixed to said plurality of longitudinally extending gusset plates, and alternatively, are interposed between and individually fixed to said plurality of longitudinally extending gusset plates and to said side wall members of said bulk material cargo container liner.

12. The bulk material cargo container liner as set forth in claim 1, further comprising:
cleat means fixedly mounted upon said side wall members of said bulk material cargo container liner for operatively engaging corresponding configured recessed regions of the bulk material cargo container so as to effectively retain said bulk material cargo container liner at a fixed position within the bulk material cargo container even when the bulk material cargo container is tilted so as to unload the bulk cargo material from said bulk material cargo container liner.

13. The bulk material cargo container liner as set forth in claim 1, wherein:
said means disposed within said bulk material cargo container liner for impressing said restraint forces upon said rear wall member of said bulk material cargo container liner comprises a plurality of gusset plate assemblies wherein each one of said gusset plate assemblies comprises at least one pair of gusset plates integrally connected together.

14. The bulk material cargo container liner as set forth in claim 13, wherein:
said at least one pair of gusset plates are disposed parallel to each other such that the particular one of said gusset plate assemblies can be disposed within a central region of said bulk material cargo container liner.

15. The bulk material cargo container liner as set forth in claim 13, wherein:
said at least one pair of gusset plates are disposed in a convergent manner with respect to each other such that the particular one of said gusset plate assemblies can be disposed within a corner region of said bulk material cargo container liner.

16. The bulk material cargo container liner as set forth in claim 14, further comprising:
a transversely disposed reinforcement plate interconnecting said pair of parallel gusset plates together.

17. The bulk material cargo container liner as set forth in claim 16, further comprising:
a transversely disposed reinforcement plate interconnecting said pair of convergent gusset plates together.

18. The bulk material cargo container liner as set forth in claim 14, further comprising:
a plurality of reinforcing strips interconnecting said plurality of parallel gusset plates to said floor member of said. bulk material cargo container liner.

19. The bulk material cargo container liner as set forth in claim 15, further comprising:
reinforcing webbing interconnecting at least some of said plurality of parallel gusset plates to said floor member of said bulk material cargo container liner.

* * * * *